(12) United States Patent
Kavounas et al.

(10) Patent No.: US 12,197,428 B1
(45) Date of Patent: *Jan. 14, 2025

(54) CORRECTIVE NOTIFICATION TO ACCOUNT FOR DELAY OR ERROR IN UPDATING DIGITAL RULES APPLIED TO PRODUCE RESOURCES

(71) Applicant: Avalara, Inc., Seattle, WA (US)

(72) Inventors: Gregory T. Kavounas, Bellevue, WA (US); Pascal Patrice Van Dooren, Mercer Island, WA (US); Kevin James Hess, Hillsborough, NC (US); Barnabas Kendall, San Jose, CA (US)

(73) Assignee: AVALARA, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,740

(22) Filed: Dec. 5, 2023

Related U.S. Application Data

(63) Continuation of application No. 17/020,748, filed on Sep. 14, 2020, now Pat. No. 11,874,826, which is a
(Continued)

(51) Int. Cl.
*G06F 16/23* (2019.01)
*G06Q 30/016* (2023.01)
(Continued)

(52) U.S. Cl.
CPC ......... *G06F 16/2379* (2019.01); *G06Q 40/00* (2013.01); *G06Q 40/10* (2013.01);
(Continued)

(58) Field of Classification Search
CPC .... G06F 16/2379; G06Q 40/00; G06Q 40/10; G06Q 40/123; G06Q 30/016; G06Q 30/0205; G06Q 50/26
See application file for complete search history.

(56) References Cited

U.S. PATENT DOCUMENTS 7,783,536 B2 *  8/2010  William ............... G06Q 40/123
705/417
7,933,803 B1 *  4/2011  Nadler .................. G06Q 40/02
705/31

(Continued)

OTHER PUBLICATIONS

Notice of Allowance, U.S. Appl. No. 17/020,748, Oct. 31, 2023, 11 pages.

*Primary Examiner* — Michael Jared Walker
(74) *Attorney, Agent, or Firm* — Nicholson, De Vos, Webster & Elliott, LLP

(57) ABSTRACT

In embodiments, a first resource is produced for a first dataset having a time indicator, by applying a first digital rule. A first notification can be caused to be transmitted about an aspect of the first resource to a remote device. A second dataset can be stored, which has values derived from the first dataset, and encodes a parameter of the first resource. A second digital rule may be stored to replace the first digital rule, at an updating time (Tupd). The second digital rule may have an effective time (Teff) prior to the actual updating time Tupd. A second resource may be produced by applying the second digital rule. A second notification can be caused to be transmitted about an aspect of the second resource to a remote device.

18 Claims, 13 Drawing Sheets

Related U.S. Application Data continuation-in-part of application No. 16/702,420, filed on Dec. 3, 2019, now abandoned.

(51) Int. Cl.

| | | |
|---|---|---|
| *G06Q 30/0204* | (2023.01) | |
| *G06Q 40/00* | (2023.01) | |
| *G06Q 40/10* | (2023.01) | |
| *G06Q 40/12* | (2023.01) | |
| *G06Q 50/26* | (2024.01) | |

(52) U.S. Cl.
CPC ......... *G06Q 40/123* (2013.12); *G06Q 30/016* (2013.01); *G06Q 30/0205* (2013.01); *G06Q 50/26* (2013.01)

(56) References Cited

U.S. PATENT DOCUMENTS

| | | | | |
|---|---|---|---|---|
| 8,620,578 B1 * | 12/2013 | Brown | ................ | G01C 21/362 |
| | | | | 701/425 |
| 8,725,407 B2 * | 5/2014 | Hurley | ............... | G01C 21/3811 |
| | | | | 701/408 |
| 9,760,915 B2 * | 9/2017 | Pavlou | ................ | G06Q 40/123 |
| 10,332,216 B2 * | 6/2019 | Barsade | ............... | G06Q 40/123 |
| 10,445,818 B1 * | 10/2019 | Chowdhary | ........... | G06Q 20/14 |
| 10,769,611 B2 * | 9/2020 | McNeel | ................ | H04W 4/021 |
| 10,872,100 B1 * | 12/2020 | Shefferman | ........... | G06F 16/958 |
| 10,915,524 B1 * | 2/2021 | Gupta | .................... | G06F 16/27 |
| 11,176,620 B1 * | 11/2021 | Lubczynski | ......... | G06Q 40/125 |
| 11,238,542 B1 * | 2/2022 | Wixted | .............. | G06Q 30/0633 |
| 11,429,572 B2 * | 8/2022 | Vanhooser | ............ | G06F 16/215 |
| 2002/0138765 A1 * | 9/2002 | Fishman | .............. | G06Q 20/346 |
| | | | | 705/67 |
| 2003/0093320 A1 * | 5/2003 | Sullivan | ............... | G06Q 20/207 |
| | | | | 705/19 |
| 2006/0085275 A1 * | 4/2006 | Stokes | ................... | G06Q 40/02 |
| | | | | 705/27.1 |
| 2007/0136158 A1 | 6/2007 | Rawlings et al. | | |
| 2007/0136159 A1 * | 6/2007 | Rawlings | ............... | G06Q 20/14 |
| | | | | 705/31 |
| 2009/0187500 A1 * | 7/2009 | Wilson | ................. | G06Q 40/123 |
| | | | | 705/31 |
| 2013/0013471 A1 * | 1/2013 | Fishman | ................ | G06Q 40/00 |
| | | | | 705/31 |
| 2014/0172656 A1 * | 6/2014 | Shaw | ................... | G06Q 40/123 |
| | | | | 705/31 |
| 2014/0351105 A1 * | 11/2014 | Hamm | .................... | G06F 16/13 |
| | | | | 705/31 |
| 2016/0019215 A1 * | 1/2016 | Murphey | ............ | G06F 16/2358 |
| | | | | 707/723 |
| 2016/0042466 A1 * | 2/2016 | Herndon | ................ | G06Q 40/00 |
| | | | | 705/31 |
| 2016/0140668 A1 * | 5/2016 | Maguire | ................ | G06Q 40/123 |
| | | | | 705/31 |
| 2019/0114609 A1 * | 4/2019 | Burton | ............... | G06Q 20/4016 |
| 2021/0081818 A1 * | 3/2021 | Fahmy | ................... | G06N 20/00 |
| 2021/0158456 A1 * | 5/2021 | Morgan | ................. | G06Q 30/06 |

\* cited by examiner

USE CASE

USE CASE

USE CASE

USE CASE

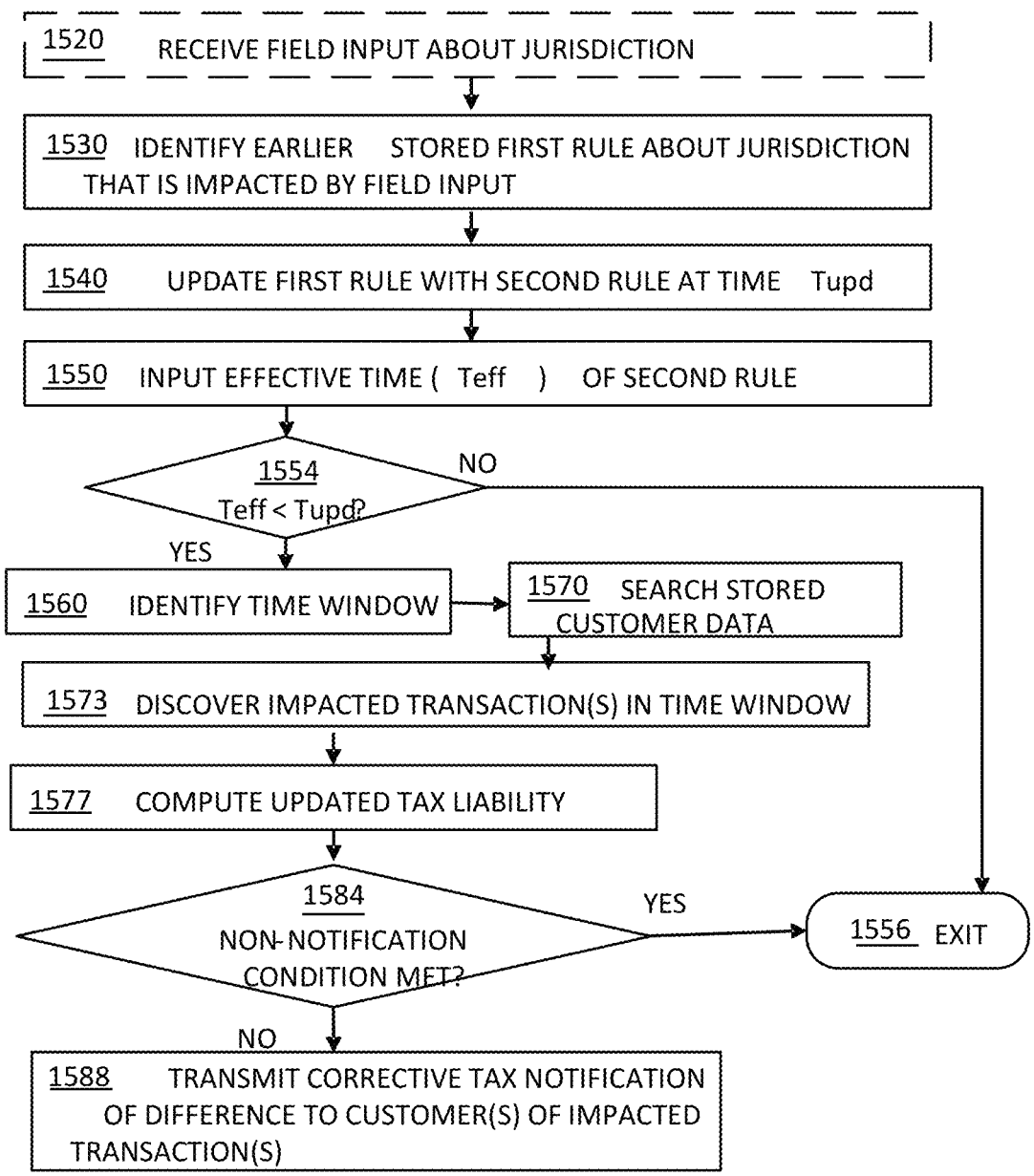
FIGURE 15     *USE CASE*

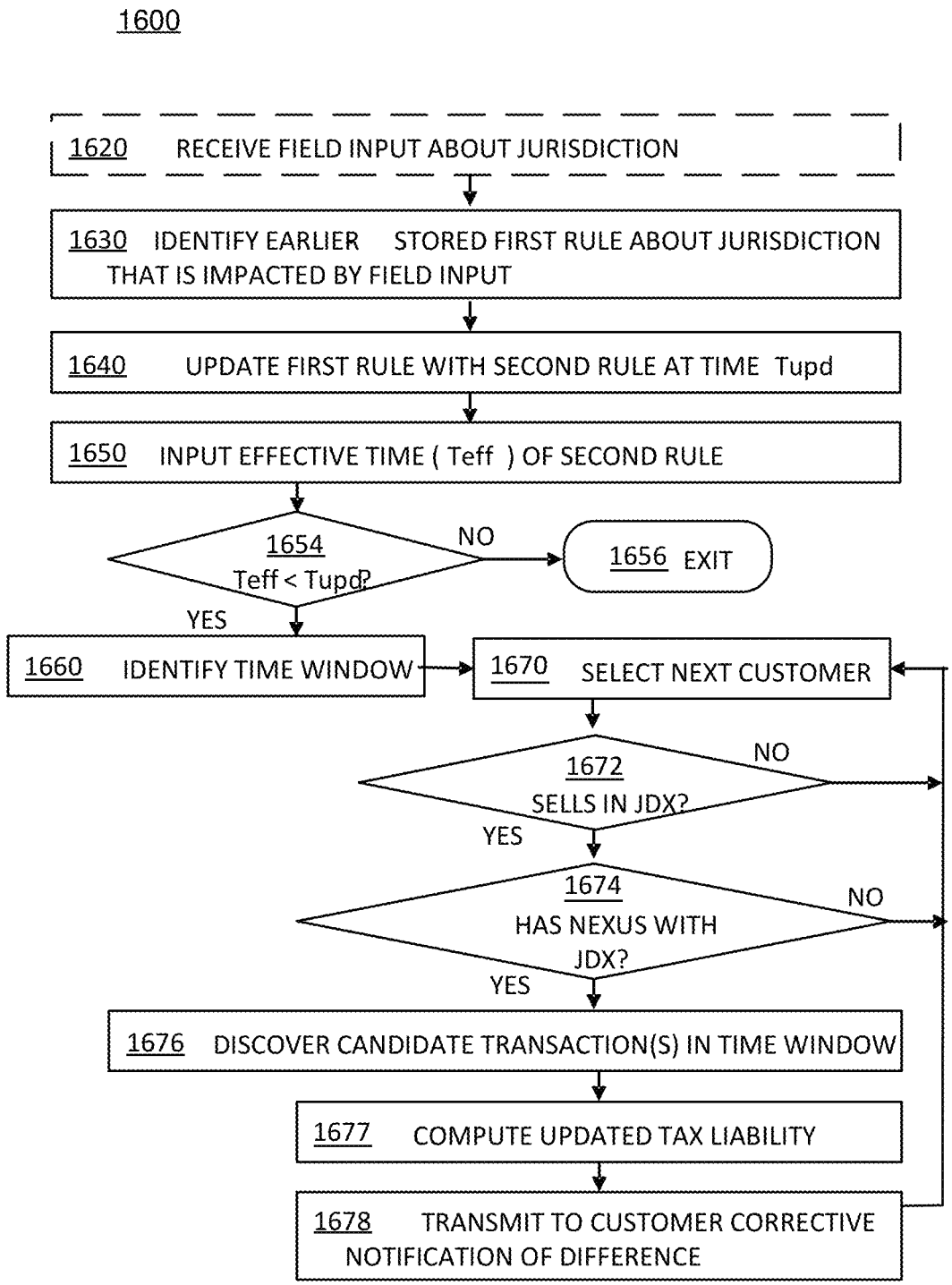
FIGURE 16   USE CASE

CORRECTIVE NOTIFICATION TO ACCOUNT FOR DELAY OR ERROR IN UPDATING DIGITAL RULES APPLIED TO PRODUCE RESOURCES

CROSS-REFERENCE TO RELATED APPLICATIONS

This application is a continuation of U.S. application Ser. No. 17/020,748, filed Sep. 14, 2020 (now U.S. Pat. No. 11,874,826), which is a continuation-in-part of U.S. application Ser. No. 16/702,420, filed Dec. 3, 2019, which are commonly assigned and hereby incorporated by reference.

BRIEF SUMMARY

The present description gives instances of computer systems, storage media that may store programs, and methods.

In embodiments, a computer system may receive a first dataset having values from a first remote device via a network. At least one of the values may characterize an attribute of a certain entity. At least another of the values may be a first time indicator (T1) indicating a first time instance for the attribute. The computer system may access a first digital rule having a first condition and a first consequent associated with the first condition. The computer system may then recognize that the first condition is met by at least one of the values of the first dataset. The computer system may then produce a first resource for the first dataset by applying the first consequent. The computer system may then cause a first notification to be transmitted about an aspect of the first resource to a second remote device via the network. The computer system may store a second dataset. The second dataset may include a first new value encoding a parameter for the first resource, a second new value derived from one of the values of the first dataset, and a second time indicator (T2) derived from the T1. The computer system may store, at an updating time (Tupd), a second digital rule in a rules memory. The second digital rule may have a second condition and a second consequent associated with the second condition. The second digital rule may be different from the first digital rule. The computer system may input, an effective time (Teff) at which the second digital rule replaces the first digital rule. The computer system may recognize that the second condition is met by at least one of the values of the stored second dataset. The computer system may then produce, by applying the second consequent, a second resource for the second dataset, responsive to the T2 occurring after the Teff but prior to the Tupd. The second resource may be distinct from the first resource. The computer system may then cause a second notification to be transmitted about an aspect of the second resource to a third remote device via the network.

An advantage can be that in embodiments, the third remote device can be notified about the aspect of the second resource produced by applying the second digital rule which may be more accurate, correct, or otherwise improved relative to the first digital rule. A use case can be that in embodiments the third remote device can be notified about an aspect of an updated or corrected tax obligation produced by applying an updated digital tax rule as opposed to an outdated tax rule, and this may allow the third remote device to have a more accurate or correct estimate of a real tax obligation.

Embodiments provide an improvement to the functioning of a computer system and to the technical field of producing a resource with a computer system. Such embodiments improve the functioning of the computer system by providing the computer system with the ability to identify and potentially mitigate an inaccuracy in a previously produced resource. This may be accomplished by storing a second dataset, producing a second resource, and the like, as described elsewhere herein. Advantageously, the ability to identify and potentially mitigate an inaccuracy in a previously produced resource, when a rule used to produce the resource changes over time, is a technical benefit to the computer system and to the technical field of producing the resource with the computer system.

Embodiments include operations that are not well-understood, routine, or conventional operations known in the art. For example, it is not believed to be known in the art to store the second dataset or the T2, to keep track of the difference between the Tupd and the Teff, and so on. As such, without the recognition of these and other teachings as disclosed herein, it may not otherwise even be possible to manually perform the above-described operations. Accordingly, these embodiments do not merely automate well-understood, routine, or conventional operations. Also, the use of the computer system to perform the above-described operations helps to avoid needing to do them manually, which even if it were possible and feasible, would tend to be time consuming, costly, and error prone.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 15 is a flowchart for illustrating sample methods for operational examples and use cases.

FIG. 16 is a flowchart for illustrating sample methods for operational examples and use cases.

DETAILED DESCRIPTION

As has been mentioned, the present description is about computer systems, storage media that may store programs, and methods. Embodiments are now described in more detail.

Figure 1:
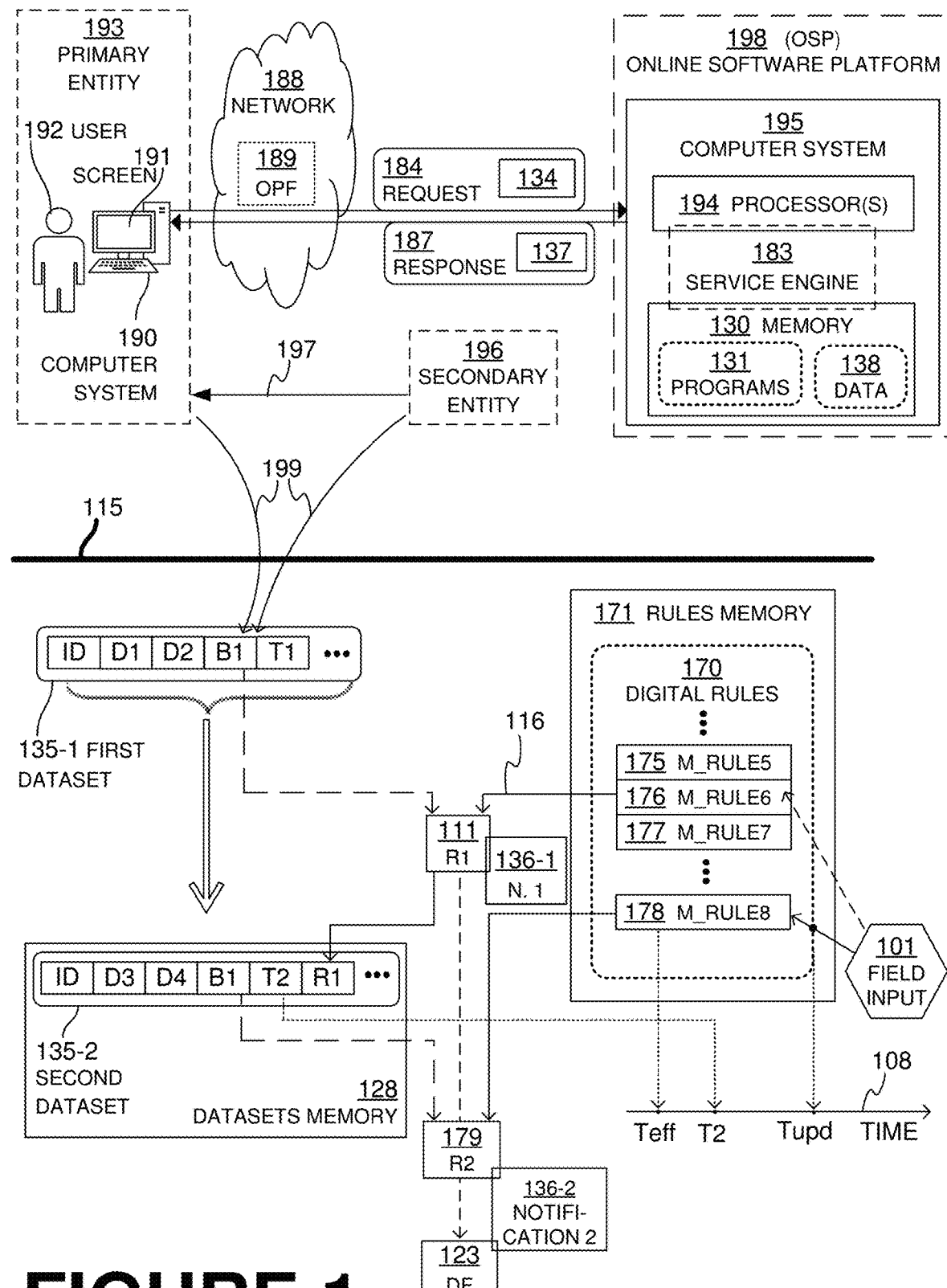
FIG. 1 is a diagram showing sample aspects of embodiments.

FIG. 1 is diagram showing sample aspects of embodiments. A thick line 115 separates this diagram, although not completely or rigorously, into a top portion and a bottom portion. Above the thick line 115 the emphasis is mostly on entities, components, their relationships, and their interactions, while below it the emphasis is mostly processing of data that takes place often within one or more of the components above.

Above the thick line 115, a sample computer system 195 according to embodiments is shown. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 may optionally be implemented as part of an online software platform (OSP) 198. The OSP 198 can be configured to perform one or more predefined services, for example via operations of the service engine 183. Such services can be searches, determinations, computations, verifications, notifications, the transmission of specialized information, including data that effectuates payments, the generation and transmission of documents, the online accessing other systems to effect registrations, and so on, including what is described in this document.

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity 193, which can be referred to also merely as entity. In such instances, the user 192 can be an agent of the entity 193, and even within a physical site of the entity 193, although that is not necessary.

The computer system 190 may access the computer system 195 via a communications network 188, such as the internet. Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may apply digital rules 170 to the payload 134 to determine a requested first resource (R1) 111, form a payload 137 that is an aspect of the first resource (R1) 111, and then push, send, or otherwise cause a response 187 that carries the payload 137 to be transmitted to the connector. The connector reads the response 187, and forwards the payload 137 of the resource to the certain application.

In an alternative such architecture, a device remote to the service engine 183, such as computer system 190, may have a particular application (not shown). In addition, the computer system 195 implements a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 to directly consume a REST API from their particular application, without using a connector. The particular application of the remote device may be able to fetch internally from the remote device the details required for the service desired from the OSP 198, and thus send or push a request to the REST API. In turn, the REST API talks in background to the service engine 183. Again, the service engine 183 determines the requested first resource (R1) 111, and sends an aspect of it back to the REST API. In turn, the REST API sends the response 187 having the payload 137 including the aspect of the first resource (R1) 111 to the particular application.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the primary entity 193 may have data about one or more secondary entities. Only one such secondary entity 196 is shown, with some of its data known to the primary entity 193 as suggested by an arrow 197. The primary entity 193 and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 195 receives one or more datasets. A sample received first dataset 135-1 is shown below the line 115. The first dataset 135-1 may be received by the computer system 195 in a number of ways. In some embodiments, one or more requests may be received by the computer system 195 via a network. In this example, a request 184 is received by the computer system 195 via the network 188. The request 184 has been transmitted by the remote computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the first dataset 135-1. In this example the single payload 134 encodes the entire first dataset 135-1, but that is not required. In fact, a dataset can be received from the payloads of multiple requests. In such cases, a single payload may encode only a portion of the dataset. In other cases, the payload of a single request may encode multiple datasets. Additional computers may be involved with the network 188, some beyond the control of the user 192 or OSP 198, and some within such control.

The first dataset 135-1 has values that can be numerical, alphanumeric, Boolean, and so on, as needed for what the values characterize. For example, an identity value (ID) may indicate an identity of the first dataset 135-1, so as to differentiate it from other such datasets. At least one of the values of the first dataset 135-1 may characterize an attribute of a certain one of the entities 193 and 196, as indicated by arrows 199. (It should be noted that the arrows 199 describe a correspondence, but not the journey of data in becoming the received first dataset 135-1.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, and so on.

In some embodiments, a dataset may also have a time indicator to indicate a time associated with the attribute of the certain entity. For example, the first dataset 135-1 has a first time indicator (T1) to indicate a first time instance for the attribute for the certain one of the entities 193 and 196. In some embodiments, the time indicator may be a time stamp or other value to indicate that the certain entity had, possessed, or was characterized by the attribute at the associated time. The time indicator (e.g., T1) may be expressed in a number of different ways, such as according to conventional calendar date and clock time (e.g., Coordinated Universal Time (UTC)), Internet Time, Network Time Protocol (NTP), Precision Time Protocol (PTP), an arbitrary/non-standardized monotonically increasing counter that is used consistently by all parties involved, etc. The first dataset 135-1 may further have additional such values, as indicated by the horizontal dot-dot-dot, also known as ellipsis, to the right of the first dataset 135-1. In some embodiments, the first dataset 135-1 has values that characterize attributes of both the primary entity 193 and the secondary entity 196, but that is not required.

In embodiments, stored digital main rules may be accessed by the computer system 195. These rules are digital in that they are implemented for use by software. For example, these rules may be implemented within programs 131 and data 138. The data portion may alternatively be implemented in memories in other places, which can be accessed via the network 188.

In this example, at least three sample digital main rules are shown explicitly, namely M_RULE5 175, M_RULE6 176, and M_RULE7 177. These are part of digital rules 170, which can be stored in a rules memory 171. The digital rules 170 may include additional rules, as suggested by the vertical dot-dot-dots. Such additional rules can include digital precedence rules, and so on. The digital rules 170 may be implemented as data structures stored as data 138 in the memory 130, or as data in other places, accessed via the network 188.

In embodiments, a first one of the digital main rules may be identified and accessed from among the accessed stored digital rules by the computer system 195. In particular, values of the first dataset 135-1 can be tested, against logical conditions of the digital main rules, as described later in this document. In this example, the first M_RULE6 176 is thus identified, which is indicated also by the beginning of an arrow 116 that is described in more detail later in this document. Identifying may be performed in a number of ways, depending on how the digital main rules are implemented. An example is now described.

Figure 2:
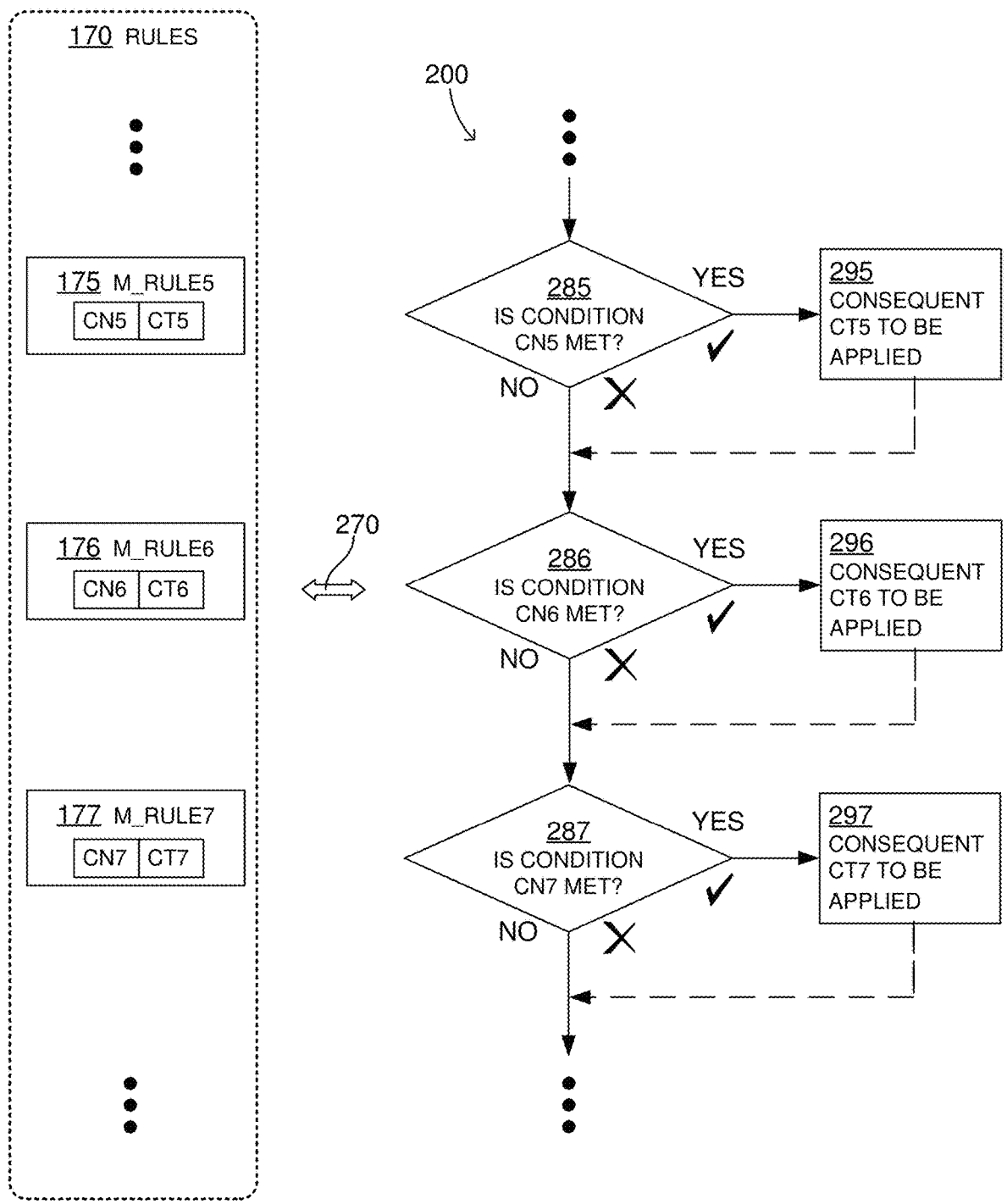
FIG. 2 repeats rules of FIG. 1 in more detail, and juxtaposes them with a flowchart portion for a sample method of how it may be recognized that a condition of a rule can be met for its consequent to be applied, all according to embodiments.

Referring now also to FIG. 2, some of the digital main rules of digital rules 170 are repeated from FIG. 1 in more detail. In addition, according to an arrow 270, these digital main rules are shown juxtaposed with a flowchart portion 200. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. In this example, the digital main rules M_RULE5 175, M_RULE6 176, and M_RULE7 177 of FIG. 1, include respective conditions CN5, CN6, CN7, and respective consequents CT5, CT6, CT7 associated with the respective conditions CN5, CN6, CN7, respectively.

In embodiments, therefore, identifying the first digital main rule is performed by recognizing, by the computer system 195, that a first condition of the first digital main rule is met by at least one of the values of the first dataset (e.g., the first dataset 135-1). An example is shown by flowchart portion 200 of FIG. 2. According to successive determination diamonds 285, 286, 287, it is determined whether or not conditions CN5, CN6, CN7 are met by at least one of the values of the dataset, respectively. If the answer is NO, then execution may proceed to the next diamond. If the answer is YES then, according to operations 295, 296, 297, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the first M_RULE6 176 was thus identified. With reference to FIG. 2, the identification may have happened at determination diamond 286 of the flowchart portion 200, at which time it was recognized that condition CN6 was met by a value of the first dataset 135-1. This made: the condition CN6 be the first condition, the digital main rule M_RULE6 176 be the first digital main rule, and the consequent CT6 be the first consequent of the first digital main rule 176. And the first consequent CT6 is associated with the first condition CN6, since both are included by the first digital main rule 176. Therefore, according to operation 296, consequent CT6 is what happens or is applied, as described below.

A number of examples of recognizing that a certain condition of a certain digital rule is met by at least one of the values of the dataset are possible. For instance, the certain condition could define a boundary of a region that is within a space. The region could be geometric, and be within a larger space. The region could be geographic, within the space of a city, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the first dataset 135-1 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The above embodiments are only examples, and not limiting. For instance, the example of FIG. 2 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 200. Or, as shown, it may be determined that more than one of the digital main rules is to be applied (e.g., determination diamond 286 may evaluate to YES such that consequent CT6 is to be applied, and determination block 287 may also evaluate to YES such that consequent CT7 is to be applied).

Where more than one of the digital main rules are found that could be applied, there are additional possibilities. For instance, the computer system 195 of FIG. 1 may further access at least one stored digital precedence rule (not shown). Accordingly, the first digital main rule may be thus identified also from the digital precedence rule. In particular, the digital precedence rule may arbitrate which one or more of the digital main rules is to be applied. To continue the previous example, if a value of the first dataset 135-1 that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 200, so as to test the applicability of fewer than all the rules.

In embodiments, a first resource may be produced for the first dataset (e.g., first dataset 135-1), by the computer system 195 applying the first consequent of the first digital main rule (e.g., M_RULE6 176). The resource can be a computational result, a document, etc., made, created or prepared for the user 192, the primary entity 193, the secondary entity 196, etc., on the basis of the attribute. As such, in some embodiments, the resource is produced by a determination and/or a computation. In the example of FIG. 1, a first resource (R1) 111 is produced for the first dataset 135-1, by the computer system 195 applying the first M_RULE6 176, and in particular its first consequent CT6, as indicated by the arrow 116. In fact, sometimes applying the consequent is more simply stated as "applying the rule".

The first resource (R1) 111 may be produced in a number of ways. For example, the first consequent can be applied to one of the values of the first dataset 135-1. For instance, one of the values of the first dataset 135-1 can be a numerical base value (B1) that encodes an aspect of the first dataset 135-1, as mentioned above. In such cases, applying the first consequent may include performing a mathematical operation on the base value B1. For example, applying the first consequent may include multiplying the base value B1 with a number indicated by the first consequent. Such a number can be, for example, a percentage, e.g., 1.5%, 3%, 5%, and so on. Such a number can be indicated directly by the first rule, or be stored in a place indicated by the first rule, and so on.

As mentioned above, in some embodiments two or more digital main rules may be applied. For instance, the computer system 195 may recognize that an additional condition of an additional one of the accessed digital main rules 170 is met by at least one of the values of the first dataset 135-1. In this example there would be no digital precedence rules, or the available digital precedence rules would not preclude both the first digital main rule and the additional digital main rule from being applied concurrently. Such an additional digital main rule would have an additional consequent.

In such embodiments, the resource may be produced by the computer system applying the first consequent and the additional consequent. For instance, where the base value B1 is used, applying the first consequent may include multiplying the base value B1 with a first number indicated by the first consequent, so as to compute a first product. In addition, applying the additional consequent may include multiplying the base value B1 with a second number indicated by the additional consequent, so as to compute a second product. Then, the resource may be produced by summing the first product and the second product.

In embodiments, a notification can be caused to be transmitted (e.g., on the network 188) by the computer system 195. The notification can be about an aspect of the first resource (R1) 111. In the example of FIG. 1, a first notification (N. 1) 136-1 can be caused to be transmitted by the computer system 195, for example as an answer or other response to the received first dataset 135-1. The first notification 136-1 can be about an aspect of the first resource (R1) 111. In particular, the first notification 136-1 may inform about the aspect of the first resource (R1) 111, namely that it has been determined, where it can be found, what it is, or at least a portion or a statistic of its content, and so on.

The first notification 136-1 can be transmitted to one of an output device and another device. The output device may be the screen of a local user or a remote user. The first notification 136-1 may thus cause a desired image, message, or other such notification to appear on the screen, such as within a Graphical User Interface (GUI), and so on. The other device can be the remote device, from which the first dataset 135-1 was received, as in the example of FIG. 1. In particular, the computer system 195 causes the first notification 136-1 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example the single payload 137 encodes the entire first notification 136-1, but that is not required. Similarly with what is written above about encoding datasets in payloads, the first notification 136-1 instead may be provided via two or more payloads, or in other cases the first notification 136-1 and at least one other notification may be included in the same single payload. Along with the aspect of the first resource (R1) 111, it is advantageous to embed in the payload 137 the identity value (ID) and/or one or more values of the first dataset 135-1. This will help the recipient correlate the response 187 to the request 184, and therefore match the received aspect of the first resource (R1) 111 as the answer to the first dataset 135-1.

Referring again to FIG. 1, a second dataset may be stored by the computer system 195. In some embodiments, the second dataset may include a first new value encoding a parameter for the first resource (e.g., the first resource (R1) 111), a second new value derived from one of the values of the first dataset (e.g., first dataset 135-1), and a second time indicator (T2) derived from the first time indicator (T1). The computer system 195 may store the second dataset in the memory 130, in memory or storage coupled with the computer system 195 via a network, and so on. The second dataset may preserve or store values derived from and/or about the first dataset (e.g., first dataset 135-1) to be used by the computer system 195 to perform operations described further below.

A sample second dataset 135-2 is shown below the line 115. The second dataset 135-2 is stored in a datasets memory 128. The datasets memory 128 may be stored in the memory 130, network connected memory, etc. As shown by a downward pointing arrow leading from the first dataset 135-1 to the second dataset 135-2, the second dataset 135-2 may be at least partly derived from and/or based on the first dataset.

In some embodiments, the second dataset 135-2 may include a first new value encoding a parameter for the first resource (R1) 111. In some cases, the first new value may be an identical copy of the computed numerical value of the first resource (R1), as shown by an arrow leading from the first resource (R1) 111 to the second dataset 135-2. In other cases, the first new value may be the numerical base value (B1). As discussed above, a mathematical operation of a first consequent of a first digital rule (e.g., M_RULE6 176) may have been performed on the numerical base value (B1) to produce the first resource (R1) 111. In some cases, the numerical base value (B1) of the second dataset 135-2 may be copied from or otherwise derived from the numerical base value (B1) of the first dataset 135-1. The sample second dataset 135-2 optionally includes both R1 and B1, although this is not required.

The second dataset 135-2 may also include a second time indicator (T2) derived from the first time indicator (T1) of the first dataset 135-1. In some embodiments, the T2 in the second dataset 135-2 may have the same value as the T1 of the first dataset 135-1. Alternatively, the T2 may be a converted or otherwise adjusted version of the T1 (e.g., converted or adjusted from one timekeeping standard or protocol to another). As another option, the T2 may be a time, which is typically a short period of time (e.g., typically much less than a minute) after T1, such as a time when the second dataset 135-2 is stored.

The second dataset 135-2 may also include a second new value, and in some embodiments optionally one or more other values, copied, calculated, adjusted, or otherwise derived from the values of the first dataset 135-1. For example, the sample second dataset 135-2 includes an identical copy of the identity value (ID) that indicates the identity of the corresponding first dataset 135-1 (which may also be used to indicate the identity of the second dataset 135-2). The sample second dataset 135-2 also includes a value D3 and a value D4 each characterizing an attribute (of the previously described types) of a certain one of the entities 193 and 196. In some cases, the values D3 and D4 may be identical to the values D1 and the D2 of the first dataset 135-1. In other cases, the values D3 and D4 may be supersets of, subsets of, or replacement values for, the values D1 and D2. The supersets and replacement values may be obtained by the computer system 195 looking up other data about the pertinent entities 193 and 196, such as in the memory 130. For example, the D3 may be mapped to the D1 in a table stored in the memory 130. In this case, the specific sample second dataset 135-2 includes a value derived from each of the corresponding values of the sample first dataset 135-1, and also the value of the first resource (R1) 111, although this is not required. The second dataset 135-2 may optionally have one or more additional values, as indicated by the horizontal ellipsis to the right of the second dataset 135-3. In other embodiments, the second dataset may instead include a subset or superset of such values as well as entirely different values.

In embodiments, a field input may optionally be received after the second dataset (e.g., second dataset 135-2) has been stored. A sample field input 101 is shown below the line 115. In some embodiments, the field input 101 is received by a human operator who interprets it mentally and follows it as an instruction. In other embodiments, the field input 101 is received by the computer system 195. In such embodiments, the field input 101 broadly represents an input to the computer system 195 from a user, another computer system, a network, another entity, or a combination thereof. In some cases, a user of the computer system 195, or computer system connected to the computer system 195, may provide the field input 101 by entering data through a keyboard or other type of data entry device. In other cases, one or more control and/or configuration messages may be received by the computer system 195 from another computer system, a network, another entity, or the like, to provide the field input 101.

In either type of embodiment, the field input 101 may specify or otherwise indicate a change to be made to the digital main rules 170. Such a change may include a change to one of the digital main rules 170 (e.g., to a condition and/or a consequent), storage of a new digital main rule in the rules memory 171, inactivation, changing/decreasing the precedence of, or removal (e.g., deletion) of a digital main rule from the rules memory 171, or a combination thereof. In the illustrated example, a dashed arrow leading from the field input 101 is used to indicate that the first digital main rule M_RULE6 176 is to be inactivated or removed from the rules memory 171, and a solid arrow leading from the field input 101 is used to indicate that a second digital main rule M_RULE8 178 is to be stored in the rules memory 171. The computer system 195 may inactivate or remove the first digital main rule M_RULE6 176 from the rules memory 171, and may store the second digital main rule M_RULE8 178 in the rules memory 171, optionally responsive to the received sample field input 101. The M_RULE8 178 may be stored at an updating time (Tupd). In some embodiments, the second digital main rule M_RULE8 178 may be intended as and/or may serve as a replacement for the first digital main rule M_RULE 6 176. In some embodiments, the second digital rule M_RULE8 178 may take precedence over the first digital rule M_RULE 6 176. Different ways in which this may happen will be described further below. The second digital rule may have a second condition (e.g., CN8) and a second consequent (e.g., CT8) associated with the second condition. The second digital rule M_RULE8 178 may be different from the first digital rule M_RULE 6 176 (e.g., the first and second conditions may be different, the first and second consequents may be different, or both).

There are various possible reasons why such changes may be made to the digital main rules 170 such as a digital main rule and/or a value used by the digital main rule becoming outdated, an error being discovered in a digital main rule and/or a value used by the digital main rule, a mathematical operation of a digital main rule being updated, improved, or otherwise changed, a digital main rule being changed take into account additional parameters or factors, and the like.

In some embodiments, the computer system 195 may input, optionally responsive to the received field input (e.g., field input 101), an effective time (Teff) at which the second digital rule (e.g., M_RULE 8 178) replaces the first digital rule (e.g., M_RULE6 176). In some cases, the computer system 195 may input the Teff as part of and/or by determining the Teff from the second digital main rule (e.g., as part of and/or from a condition of M_RULE8 178). In other cases, the computer system 195 may input the Teff by determining the Teff from the field input (e.g., field input 101), or from a human operator.

Now, in some embodiments, the Teff is the time at which the second digital rule (e.g., M_RULE 8 178) is intended or expected to replace the first digital rule (e.g., M_RULE6 176), such as, for example, to ensure accuracy or correctness in calculating resources using the digital rules 170. However, one challenge is that sometimes (e.g., due to delay or other reasons) the updating time (Tupd) when the second digital rule (e.g., M_RULE8 178) is stored in the rules memory 171 may occur after the Teff. That is, the time Tupd when the second digital rule (e.g., M_RULE 8 178) is actually stored in the rules memory 171 (e.g., available for use in calculating resources) may be after the time Teff when the second digital rule (e.g., M_RULE 8 178) is intended or expected to be in the rules memory 171 (e.g., intended or expected to be available to be used to calculate resources). There are various possible reasons why this may happen such as delay in discovering through research or otherwise determining that the digital main rules 170 are to be changed, delay in being notified by another entity that the digital main rules 170 are to be changed, delay in actually changing the digital main rules 170, error in changing the digital main rules 170, and so on.

To further illustrate, a sample time axis 108 is shown below the line 115 with time increasing from left to right. A Teff is shown on the time axis 108 representing the time at which the second digital rule M_RULE8 178 is intended or expected to replace the first digital rule M_RULE6 176. A Tupd is also shown on the time axis 108 representing the time when the computer system 195 actually stores the second digital rule M_RULE8 178. The Tupd occurs after the Teff. Also, in some embodiments, the second time (T2) and/or the first time (T1) may occur after the Teff but prior to the Tupd. As mentioned above, the first time (T1) may be the same as the second time (T2).

The Tupd occurring after the Teff exposes the possibility that a discrepancy, an inaccuracy, an error, or other difference may exist between: (a) the numerical value of the first resource (e.g., the first resource (R1) 111) produced for the first dataset (e.g., the first dataset 135-1) by applying the first digital main rule (e.g., M_RULE6 176) after the Teff because the second digital main rule (e.g., M_RULE8 178) has not yet been stored in the rules memory 171; and (b) the numerical value of the first resource (e.g., the first resource (R1) 111) that would have been produced for the same first dataset (e.g., the first dataset 135-1) by applying the second digital main rule (e.g., M_RULE8 178) after the Teff had the second digital main rule (e.g., M_RULE8 178) already been stored in the rules memory 171. The first and second digital main rules are different and may produce different resources for the same dataset. This may be the case for one or more or potentially many such resources produced for datasets using the digital rules 170 when a time associated with the datasets (e.g., T2, T1, etc.) occurs after the Teff but prior to the Tupd, as will be discussed further below with respect to FIG. 4.

Still referring to FIG. 1, in some embodiments, the computer system 195 may recognize that the second condition of the second digital main rule (e.g., M_RULE8 178) is met by at least one of the values of the stored second dataset (e.g., second dataset 135-2). This may be done similarly to the ways previously described for how the computer system 195 recognized that the first condition is met by at least one of the values of the first dataset (e.g., 135-1) including the variations previously mentioned. For example, it may involve testing one or more values of the second dataset (e.g., 135-2) against conditions of the digital main rules 170, etc. Since the second dataset has been stored, its values may be used once the second digital main rule has been stored in the rules memory. In this example, the computer system recognizes that the second condition of the second main rule M_RULE8 178 is met by at least one of the values of the stored second 135-2.

In some embodiments, the computer system 195 may produce a second resource for the second dataset (e.g., second dataset 135-2) by applying the second consequent of the second digital main rule (e.g., M_RULE8 178), responsive to the T2 occurring after the Teff but prior to the Tupd. This may be done analogously to how the computer system 195 produced the first resource for the first dataset by applying the first consequent including the variations previously mentioned (e.g., performing a mathematical operation on B1, applying two or more digital rules, combining the results of two or more digital rules, etc.). The second resource may be distinct from the first resource (e.g., first resource (R1) 111), for example, by having a different numerical value. Advantageously, by producing the second resource it may be possible to identify or detect when such differences occur. Also, it may be possible to determine the magnitude of such differences.

In this example, a second resource (R2) 179 is produced for the second dataset 135-2 by applying the second consequent of the second digital main rule M_RULE8 178 (as shown by the arrow from M_RULE8 178 to the second resource (R2) 179), responsive to the T2 occurring after the Teff but prior to the Tupd. In this example, as shown by an arrow leading from the numerical base value (B1) of the second dataset, the value B1 may be accessed from the second dataset 135-2 and used along with the second consequent of M_RULE8 178 to calculate the second resource (R2) 179. In another embodiment, the numerical value of the first resource (R1) can be accessed and used instead. Also, as shown by an arrow leading from the second time indicator T2 of the second dataset, the T2 may be accessed from the second dataset 135-2 and used by the computer system 195 to determine that the second time indicator T2 occurs after the Teff but prior to the Tupd.

As such, in some embodiments, one of the values of the first dataset is a numerical base value, e.g., B1. In such embodiments, applying the first consequent includes performing a mathematical operation on the numerical base value to produce the first resource, and applying the second consequent includes performing the mathematical operation on the numerical base value to produce the second resource.

In some embodiments, a second notification can be caused to be transmitted by the computer system 195 to a third remote device via the network 188. The second notification can be about an aspect of the second resource.

In the example of FIG. 1, a second notification (notification 2) 136-2 can be caused to be transmitted by the computer system 195. In some embodiments, the second notification 136-2 can be caused to be transmitted to a third remote device via the network 188.

The second notification 136-2 can be caused to be transmitted similarly to the first notification 136-1 (e.g., via email, text message, as payload of a response transmitted on a network, caused to appear in a user interface, and so on). Similarly with what is written above, the second notification 136-2 may either be provided in two or more messages or responses or may be included along with additional notifications in the same message or response. The third remote device can be the computer system 190, or the OPF 189, or the screen 191 of the user 192, and so on. In some cases, the third remote device can be the same as the second remote device that the computer system 195 caused the first notification to be transmitted to via the network. In some cases, the third remote device can be the same as the first remote device from which the computer system 195 received the first dataset. Alternatively, the third remote device may be different remote device.

The second notification 136-2 can be about an aspect of the second resource (R2) 179. In some embodiments, the computer system 195 may compute or determine a difference between a first numerical value of the first resource (R1) 111, a second numerical value of the second resource (R2) 179, and the aspect of the second resource (R2) 179 can be about the difference (DF) 123 (e.g., the difference, a rounded version of the difference, a sum of the difference and other such differences, a portion or statistic of its content, a reference to where such values may be found, and so on). In other embodiments, the aspect of the second resource (R2) 179 can be about the numerical value of the second resource (R2) 179 (e.g., the numerical value of the second resource (R2) 179, a rounded version of it, a sum of it and other numerical values, a portion or statistic of its content, a reference to where such values may be found, and so on). The second notification 136-2 can be about various different aspects of the second resource (R2) 179 as long as the recipient of the second notification understands what it is being provided. Advantageously, in some embodiments, this may allow a correction or adjustment to be made to correct or adjust for the difference between the first resource (R1) 111 and the second resource (R2) 179.

Along with the aspect of the second resource 179, in some embodiments other identifying information may optionally be included to help the recipient interpret or correlate the notification. Possible examples of such identification information include the identity value (ID), the numerical value of the first resource (R1) 111 and the time T2, and so on. In some embodiments, the computer system 195 may receive an indication of a response to the transmitted second notification 136-2, although this is not required.

Figure 3:
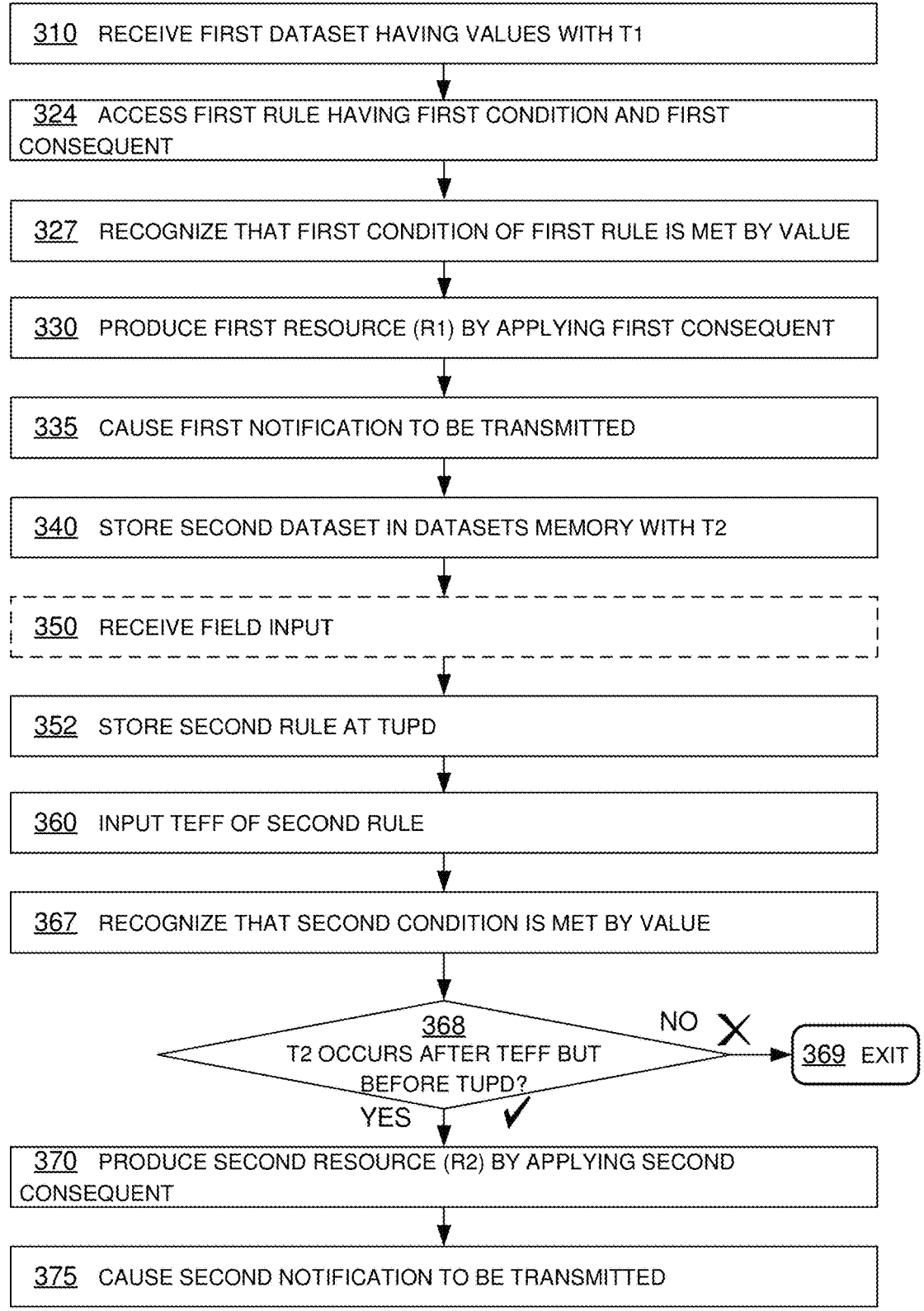
FIG. 3 is a flowchart for illustrating sample methods according to embodiments.

FIG. 3 is a flowchart illustrating a sample method 300 according to embodiments. The method 300 may be performed by a computer system, such as the sample computer system 195 of FIG. 1, the computer system 1090 or 1095 of FIG. 10, or another suitable computer system.

According to an operation 310 of method 300, the computer system may receive, from a first remote device via a network, a first dataset having values. At least one of the values may characterize an attribute of a certain entity. At least another of the values may be a first time indicator (T1) indicating a first time instance for the attribute. For example, the computer system may be the sample computer system 195 of FIG. 1 receiving the first dataset 135-1 from the computer system 190, the OPF 189, or another remote device via the network 188. The first dataset 135-1 has the values D1 and D2 characterizing attributes of the primary entity 193. The attributes may be such as those previously described. The first dataset 135-1 also has a first time indicator (T1) indicating a first time instance for the attributes.

According to an operation 324 of method 300, the computer system may access a first digital rule having a first condition and a first consequent associated with the first condition. For example, the computer system may be the sample computer system 195 of FIG. 1 accessing the first digital rule M_RULE6 176. The M_RULE6 176 may have a first condition CN6 and a first consequent CT6 associated with the first condition CN6, as further shown in FIG. 2.

According to an operation 327 of method 300, the computer system may recognize that the first condition is met by at least one of the values of the first dataset. For example, the computer system may be the sample computer system 195 of FIG. 1 recognizing that the first condition CN6 is met by at least one of the values of the first dataset 135-1. For instance, in some embodiments, the first condition CN6 may define a boundary of a region that is within a space, and the first condition CN6 could be recognized as being met if one or more values (e.g., D1 and D2) characterizing attributes of the primary entity 193 are indicative of being within the boundary instead of outside the boundary.

According to an operation 330 of method 300, the computer system may produce a first resource for the first dataset by applying (at least) the first consequent. For example, the computer system may be the sample computer system 195 of FIG. 1 producing the first resource (R1) 111 for the first dataset 135-1 by applying (at least) the first consequent CT6. In some embodiments, applying the first consequent CT6 can include performing a mathematical operation of the first consequent CT6 on a numerical base value (B1) of the first dataset 135-1 to produce the first resource.

According to an operation 335 of method 300, the computer system may cause a first notification to be transmitted about an aspect of the first resource to a second remote device via the network. For example, the computer system may be the sample computer system 195 of FIG. 1 causing the first notification 136-1 to be transmitted about an aspect of the first resource (R1) 111 (e.g., that it has been determined, where it can be found, what it is, or at least a portion or a statistic of its content) to the computer system 190, the OPF 189, or another second remote device via the network 188. In some embodiments, the aspect is the numerical value of the first resource (R1) 111, although this is not required. In some embodiments, the second remote device may be the same as the first remote device from which the first dataset was received, although this is not required.

According to an operation 340 of method 300, the computer system may store a second dataset including a first new value encoding a parameter for the first resource, a second new value derived from one of the values of the first dataset, and a second time indicator (T2) derived from the T1. For example, the computer system may be the sample computer system 195 of FIG. 1 storing the second dataset 135-2. The second dataset 135-2 includes the computed numerical value of the first resource (R1) and the numerical base value (B1) each of which encodes a parameter of the first resource (R1) 111. In other embodiments, only either one of R1 and B1 may optionally be included in the second dataset 135-2. The second dataset 135-2 also includes the second time indicator (T2) which may be the same as or derived from the first time indicator T1 of the first dataset 135-1.

According to an optional operation 350 of method 300, in some embodiments, the computer system may receive a field input after storing the second dataset. For example, the computer system may be the sample computer system 195 of FIG. 1 receiving the field input 101 after storing the second dataset 135-2. In other embodiments, however, the field input is an instruction to a human operator, who acts responsive to the field input by ensuring that operation 352 below is indeed performed.

According to an operation 352 of method 300, the computer system may store a second digital rule in a rules memory at an updating time (Tupd). This may be performed due to an operation by a human, who could be following an instruction by a field input. In other embodiments where the field input is received by a computer system, the operation 352 may be performed responsive to the received field input, for example by spawning the stored rule from the received field input 101.

The second digital rule may have a second condition and a second consequent associated with the second condition. The second digital rule may be different from the first digital rule. For example, the computer system may be the sample computer system 195 of FIG. 1 storing the second digital rule M_RULE8 178 in the rules memory 171 at an updating time (Tupd) and responsive to the received field input 101. The second digital rule may have a second condition (e.g., CN8) and a second consequent (e.g., CT8) associated with the second condition. The second digital rule M_RULE8 178 may be different from the first digital rule M_RULE6 176 (e.g., CN6 is different than CN8, CT6 is different than CT8, or both). In some embodiments, storing the second digital rule M_RULE8 178 may cause the second digital rule M_RULE8 178 to take precedence over the first digital rule M_RULE6 176 (e.g., storing M_RULE8 178 implies not using M_RULE6 176 e.g., according to a precedence rule).

According to an operation 360 of method 300, the computer system may input, optionally responsive to the received field input, an effective time (Teff) at which the second digital rule replaces the first digital rule. For example, the computer system may be the sample computer system 195 of FIG. 1 inputting responsive to the received field input, the effective time (Teff) at which the second digital rule M_RULE8 178 replaces the first digital rule M_RULE6 176. In some embodiments, the Teff may be input with the second digital rule M_RULE8 178 (e.g., input as a parameter thereof). In other embodiments, the Teff may be input with the field input 101 (e.g., input by a user as a parameter of the field input 101).

According to an operation 367 of method 300, the computer system may recognize that the second condition is met by at least one of the values of the stored second dataset. For example, the computer system may be the sample computer system 195 of FIG. 1 recognizing that the second condition (e.g., CN8) is met by at least one of the values of the stored second dataset 135-2.

According to an operation 368 of method 300, the computer system may determine whether the second time indictor (T2) occurs after the effective time (Teff) but prior to the updating time (Tupd). If not (labeled "NO"), then the method 300 may exit at operation 369. If so (labeled "YES"), the method 300 may advance to operation 370.

According to an operation 370 of method 300, responsive to the T2 occurring after the Teff but prior to the Tupd, the computer system may produce a second resource for the second dataset by applying the second consequent. For example, the computer system may be the sample computer system 195 of FIG. 1, responsive to the T2 occurring after the Teff but prior to the Tupd, producing the second resource (R2) 179 for the second dataset 135-2 by applying the second consequent (e.g., CT8) of the second digital rule M_RULE8 178. In some embodiments, applying the second consequent (e.g., CT8) may include performing a mathematical operation on the numerical base value (B1) to produce the second resource (R2) 179.

According to an operation 375 of method 300, the computer system may cause a second notification to be transmitted about an aspect of the second resource to a third remote device via the network. For example, the computer system may be the sample computer system 195 of FIG. 1 causing, the second notification 136-2 to be transmitted about an aspect of the second resource (R2) 179 to the computer system 190, the OPF 189, or another third remote device via the network 188. The second notification 136-2 may be transmitted in the ways previously described (e.g., via email, text message, caused to appear in a user interface, etc.). The aspect of the second resource may be the numerical value of the second resource (R2) 179, about a difference between the first resource (R1) 111 and the second resource (R2) 179, and so on. In some embodiments, the third remote device may be the same as the second remote device to which the computer system 195 caused the first notification 136-1 to be transmitted, although this is not required.

Variations on the sample method 300 are also possible. For example, additional operations may be added to the method 300, certain operations may be removed from the method 300, certain operations may be performed in a different order, certain operations may overlap with others, and so on. As one example, an additional operation may include the computer system 195 receiving a response from the third remote device to the transmitted second notification 136-2.

The discussion above has described how the first resource (R1) 111 produced for the first dataset 135-1 received at a time after the Teff but prior to the Tupd can have a discrepancy, inaccuracy, or error. In some embodiments, this may also be true for other resources produced for other datasets received at times after the Teff but prior to the Tupd.

Figure 4:
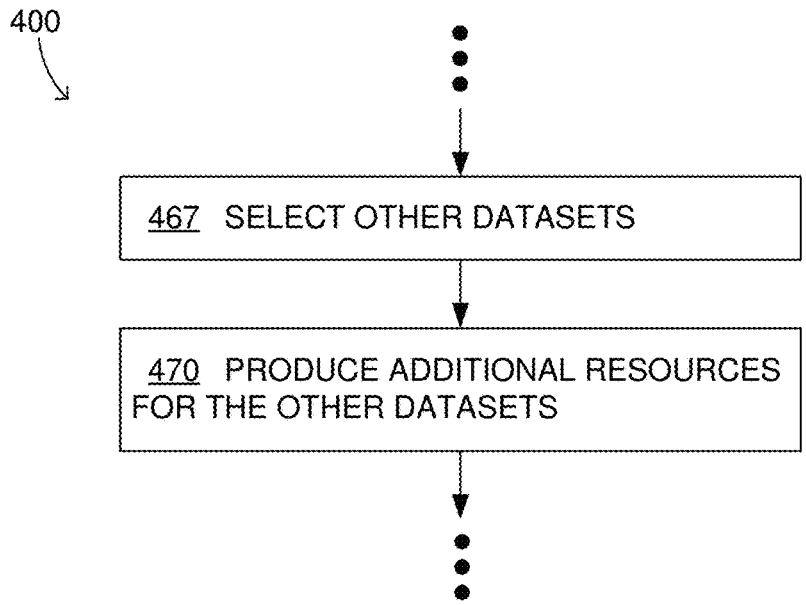
FIG. 4 is a flowchart portion for illustrating an optional additional sample method according to embodiments where resources are produced for additional datasets.
Figure 5:
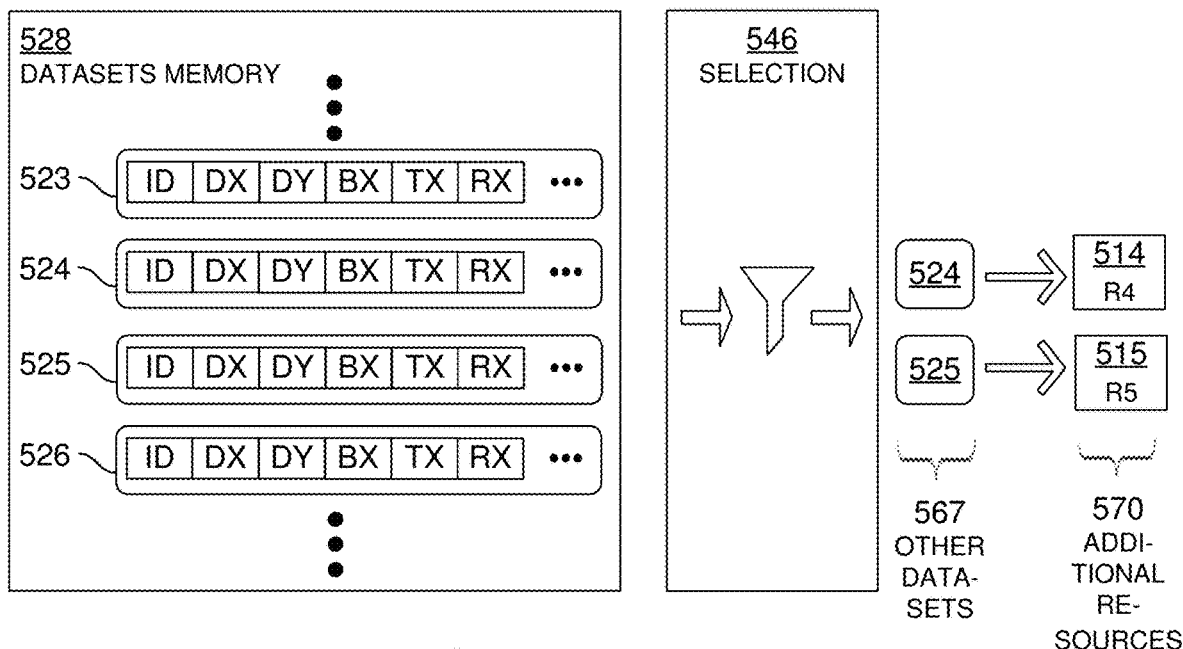
FIG. 5 is a block diagram of a sample elements according to embodiments when operations of the flowchart portion of FIG. 4 are being executed.

FIG. 4 is a flowchart portion for illustrating an optional additional sample method 400 according to embodiments where resources are produced for additional datasets. The method 400 may be performed by a computer system, such as the sample computer system 195 of FIG. 1, the computer system 1090 or 1095 of FIG. 10, or another suitable computer system. FIG. 5 is a block diagram of a sample elements according to embodiments when the operation of the method 400 of the flowchart of FIG. 4 may be executed. To streamline the description, the method 400 will be described with reference to the elements of FIG. 5.

According to an operation 467 of method 400, a computer system may select other datasets in addition to the second dataset, responsive to the T2 occurring after the Teff but prior to the Tupd. For example, the computer system may be the sample computer system 195 of FIG. 1 selecting other datasets 567 (namely datasets 524 and 525) in addition to the second dataset 135-2, responsive to the T2 occurring after the Teff but prior to the Tupd.

A datasets memory 528, which may be similar to the datasets memory 128 of FIG. 1, stores datasets 523, 524, 525, and 526, and optionally others. These datasets may be stored with values derived from corresponding datasets received from remote devices via a network similarly as described for the first dataset 135-1. In this example, all the datasets 523, 524, 525, 526, . . . have analogous values/fields to the second dataset 135-2, although datasets can also be different. A corresponding resource (RX) has already been produced, in ways previously described, for the corresponding received datasets, and in this example these resources (RX) are stored in the datasets 523, 524, 525, and 526. As previously mentioned, these resources (RX) may have been produced with discrepancies, inaccuracies, errors, or the like.

A selection module 546, which may be part of the service engine 183, the programs 131, or the like, may select the other datasets 567. In some embodiments, the selection module 546 in order to select the other datasets 567 may recognize that the second condition (e.g., CN8) of the second digital main rule (e.g., M_RULE8 178) is met by at least one of the values of each of the other datasets 567. In some embodiments, the other datasets 567 may be selected on the basis of matching a geographical criterion. For example, the first dataset (e.g., first dataset 135-1) may include a geographical indication of the certain entity (e.g., entity 193), and the other datasets 567 may be selected on the basis of also including the geographical indication of the certain entity (e.g., entity 193), although this is just one example.

Referring again to FIG. 4, according to an operation 470 of method 400, a computer system may produce additional resources for the other datasets by applying the second consequent to the other selected datasets, responsive to corresponding times of the selected other datasets occurring after the Teff but prior to the Tupd. In some embodiments, the second notification (e.g., second notification 136-2) may also be about an aspect of the additional resources. For example, the computer system may be the sample computer system 195 of FIG. 1 producing additional resources 570 for the other datasets 567 by applying the second consequent (e.g., CT8) of the second digital main rule (e.g., M_RULE8 178) to the other selected datasets 567, responsive to corresponding times of the selected other datasets 567 occurring after the Teff but prior to the Tupd. In this example, a fourth resource (R4) 514 is produced from the dataset 524 and a fifth resource (R5) 515 is produced from the dataset 525.

In some embodiments, the second notification (e.g., second notification 136-2) may also be about an aspect of the additional resources 570. Such aspects may include, for example, a sum of the second resource (R2) 179 and the additional resources, the resources themselves, a sum of discrepancies, errors, or other differences for the second resource (R2) 179 and the additional resources, the differences themselves, references where such values may be found, and so on. In some embodiments, the second notification may be about the total error or other difference for all resources produced for times occurring after the Teff but prior to the Tupd.

Figure 6:
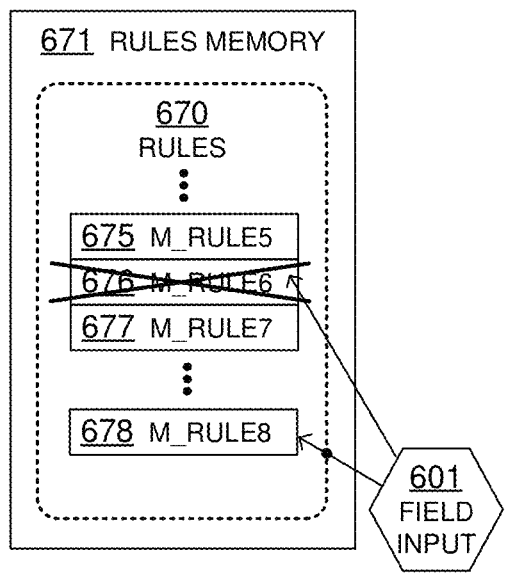
FIG. 6 is a block diagram according to an embodiment where a sample first or old digital main rule is also removed responsive to a field input, in addition to a second or new digital main rule being stored.

FIG. 6 is a block diagram according to an embodiment where a sample first or old digital main rule M_RULE6 676 is removed responsive to a field input 601, in addition to a second or new digital main rule M_RULE8 678 being stored responsive to the field input 601. A rules memory 671 stores digital main rules 670. Prior to the field input 601 the digital main rules 670 include rules 675, 676, and 677. The rules memory 671, digital main rules 670, and rules 675, 676, and 677, may be similar to those previously described for FIG. 1.

The computer system 195, responsive to the received field input 601 (which may be similar to the field input 101 of FIG. 1) may remove the first or old digital main rule M_RULE6 676 from the rules memory 671. For example, this may include deleting it, marking it as invalid, inactivating it, and so on. The computer system 195, responsive to the received field input 601, may also store the second or new digital main rule M_RULE8 678. The second or new digital main rule thus becomes applicable over the first or old digital main rule.

Figure 7:
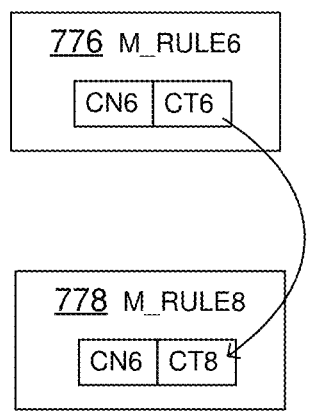
FIG. 7 is a block diagram illustrating an embodiment where a sample second or new digital main rule has the same condition as a first or old digital main rule, but a new consequent.

FIG. 7 is a block diagram illustrating an embodiment where a sample second or new digital main rule M_RULE8 778 has the same condition (CN6) as a first or old digital main rule M_RULE6 776, but a new consequent (CT8). The first or old digital main rule M_RULE6 776 has condition CN6 and consequent CT6. The computer system 195, responsive to the received a field input (not shown), may change the consequent of the first or old digital main rule M_RULE6 from CT6 to CT8 to create the second or new digital main rule M_RULE8 778. The condition CN6 of the second or new digital main rule M_RULE8 778 may remain the same as the condition CN6 of the first or old digital main rule M_RULE6 776. Changing the first digital rule M_RULE6 to create the second digital rule M_RULE8 in this way is an embodiment of storing the second digital rule M_RULE8. FIG. 7 thus could be showing a relationship between the main rule M_RULE6 676 and main rule M_RULE8 678 of FIG. 6.

Other possibilities are also contemplated. For example, in other embodiments, a second or new digital main rule may be used in addition to a first or old digital main rule. For example, one of the values of a first dataset (e.g., first dataset 135-1) may be a numerical base value (B1) that encodes an aspect of the first dataset. Applying the first consequent may include performing a mathematical operation on the numerical base value to produce the first resource (e.g., first resource (R1) 111). The numerical base value may be stored in the second dataset (e.g., second dataset 135-2) as the second new value. Applying the second consequent may include performing the mathematical operation on the second new value to produce an interim number. The second resource may be produced by adding the first resource and the interim number.

Figure 8:
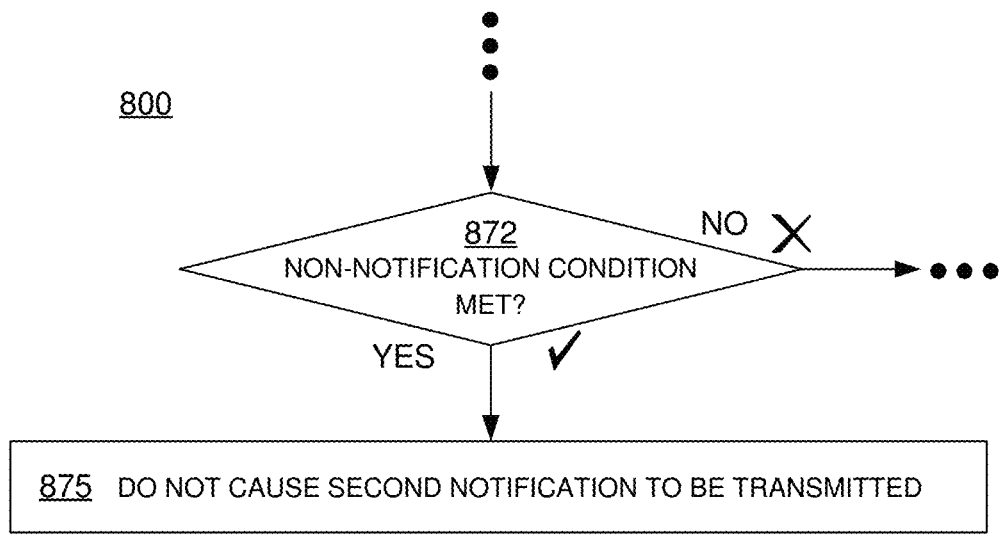
FIG. 8 is a flowchart portion for illustrating an optional additional sample method according to embodiments where a determination is made whether or not a non-notification condition is met, and a second notification is not caused to be transmitted if the non-notification is met.

FIG. 8 is a flowchart portion for illustrating an optional additional sample method 800 according to embodiments where a determination is made whether or not a non-notification condition is met, and a second notification is not caused to be transmitted if the non-notification is met. The method 800 may be performed by a computer system, such as the sample computer system 195 of FIG. 1, the computer system 1090 or 1095 of FIG. 10, or another suitable computer system.

In different embodiments, the method 800 may be started after operation 370 of FIG. 1, or after operation 470 of FIG.

4. According to an operation 872 of method 800, a computer system may determine whether or not a non-notification condition is met. For example, the computer system may be the sample computer system 195 of FIG. 1 determining whether or not a non-notification condition is met. The non-notification condition may render it undesirable to transmit the second notification 136-2.

There are various possible ways in which the determination 370 can be made. As one example, the determination may be consistent with whether an entity (e.g., primary entity 193) has settings or is otherwise configured (e.g., in the service engine 183 or otherwise in the online software platform 198) to be notified. As another example, the determination may be based on the numerical values of the first and second resources. For example, the computer system may compute a difference between a numerical value of the first resource (e.g., 135-1) and a numerical value of the second resource (e.g., 135-2), determine whether the difference is less than a threshold, and determine that the non-notification condition is met if the difference is less than the threshold, or otherwise determine that the non-notification condition is not met. In still other embodiments, the determination may be made as described further below for FIG. 9.

Referring again to FIG. 8, responsive to a determination that the non-notification condition is not met (i.e., the determination is "NO"), the method may advance to operation 375 of FIG. 3, in some embodiments, or the second notification may otherwise be caused to be transmitted.

Alternatively, responsive to a determination that the non-notification condition is met (i.e., the determination is "YES"), according to an operation 875 of method 800, a computer system may not cause the second notification to be transmitted. For example, the computer system may be the sample computer system 195 of FIG. 1 not causing the second notification 136-2 to be transmitted.

Figure 9:
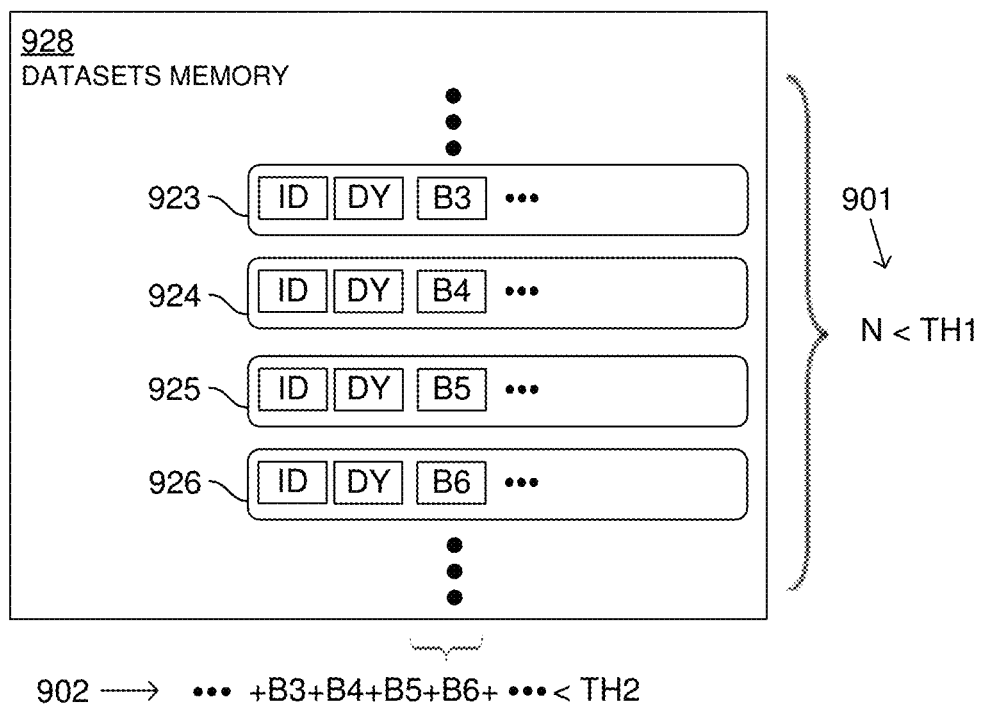
FIG. 9 is a composite diagram for embodiments where a condition of the flowchart portion of FIG. 8 is queried of sample elements by two equations.

FIG. 9 is a composite diagram for embodiments where a condition of the flowchart of FIG. 8 is queried of sample elements by two equations 901, 902. Each of the equations 901, 902 describes an inequality that implements a condition, and may be checked per the below as to whether or not it is true in a given instance.

A datasets memory 928, which may be similar to the datasets memory 128 of FIG. 1 and the datasets memory 528 of FIG. 5, stores datasets 923, 924, 925, and 926, and optionally others. In this example, the datasets 923, 924, 925, and 926 have respective numerical base values B3, B4, B5, and B6.

To implement the first equation 901, the computer system may select a plurality of other datasets from the datasets memory 928 in addition to the second dataset. This may be done substantially as previously described above responsive to their respective times T2 occurring after the Teff but prior to the Tupd. The computer system may count a set number (N) of the second dataset plus the plurality of the other datasets. The computer system may compare the set number to a first threshold (TH1). For example, the computer system may determine whether N<TH1, i.e. whether N is less than the first threshold (TH1).

To implement the second equation 902, the numerical base values may be considered, such as values B3, B4, B5, and B6. The computer system may compute a sum of the numerical base value and the other numerical base values of the other datasets. The computer system may compare the sum to a second threshold (TH2). As shown in the example of equation 902, the computer system may determine whether a sum of numerical base values that include B3+B4+B5+B6 is less than the second threshold (TH2).

The non-notification condition may be met responsive to the computer system determining that the set number is less than the first threshold, and that the sum is less than the second threshold. This is just one example. Other determinations may be based on only either one of these thresholds, other thresholds, and so on.

Details about Computer Systems

Figure 10:
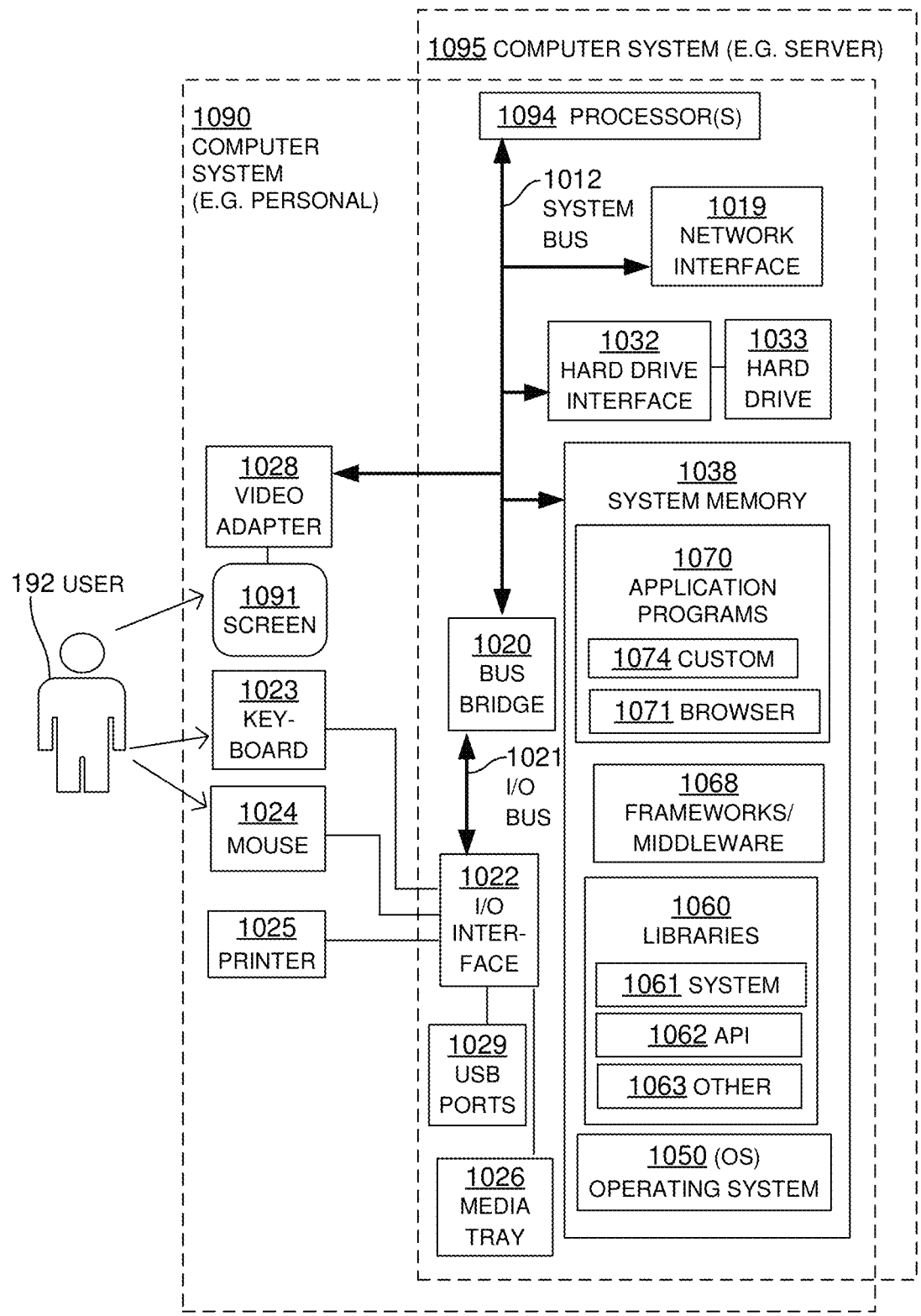
FIG. 10 is a block diagram showing additional components of sample computer systems according to embodiments.

FIG. 10 shows details for a sample computer system 1095 and for a sample computer system 1090. The computer system 1095 may be a server, while the computer system 1090 may be a personal device, such as a personal computer, a desktop computer, a personal computing device such as a laptop computer, a tablet computer, a mobile phone, and so on. Either type may be used for the computer system 195 and 190 of FIG. 1, and/or a computer system that is part of OPF 189.

The computer system 1095 and the computer system 1090 have similarities, which FIG. 10 exploits for purposes of economy in this document. It will be understood, however, that a component in the computer system 1095 may be implemented differently than the same component in the computer system 1090. For instance, a memory in a server may be larger than a memory in a personal computer, and so on. Similarly, custom application programs 1074 that implement embodiments may be different, and so on.

The computer system 1095 includes one or more processors 1094. The processor(s) 1094 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 1094 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 1095, or the computer system 1090, are not intended to be exhaustive. Rather, they are representative, for highlighting essential components that can be used with embodiments.

The computer system 1095 also includes a system bus 1012 that is coupled to the processor(s) 1094. The system bus 1012 can be used by the processor(s) 1094 to control and/or communicate with other components of the computer system 1095.

The computer system 1095 additionally includes a network interface 1019 that is coupled to system bus 1012. Network interface 1019 can be used to access a communications network, such as the network 188. Network interface 1019 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 1095 also includes various memory components. These memory components include memory components shown separately in the computer system 1095, plus cache memory within the processor(s) 1094. Accordingly, these memory components are examples of non-transitory machine-readable media. The memory components shown separately in the computer system 1095 are variously coupled, directly or indirectly, with the processor(s) 1094. The coupling in this example is via the system bus 1012.

Instructions for performing any of the methods or functions described in this document may be stored, completely or partially, within the memory components of the computer system 1095, etc. Therefore, one or more of these non-transitory computer-readable media can be configured to store instructions which, when executed by one or more processors 1094 of a host computer system such as the computer system 1095 or the computer system 1090, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 1095 include a non-volatile hard drive 1033. The computer system 1095 further includes a hard drive interface 1032 that is coupled to the hard drive 1033 and to the system bus 1012.

The memory components of the computer system 1095 include a system memory 1038. The system memory 1038 includes volatile memory including, but not limited to, cache memory, registers and buffers. In embodiments, data from the hard drive 1033 populates registers of the volatile memory of the system memory 1038.

In some embodiments, the system memory 1038 has a software architecture that uses a stack of layers, with each layer providing a particular functionality. In this example the layers include, starting from the bottom, an Operating System (OS) 1050, libraries 1060, frameworks/middleware 1068 and application programs 1070, which are also known as applications 1070. Other software architectures may include less, more or different layers. For example, a presentation layer may also be included. For another example, some mobile or special purpose operating systems may not provide a frameworks/middleware 1068.

The OS 1050 may manage hardware resources and provide common services. The libraries 1060 provide a common infrastructure that is used by the applications 1070 and/or other components and/or layers. The libraries 1060 provide functionality that allows other software components to perform tasks more easily than if they interfaced directly with the specific underlying functionality of the OS 1050. The libraries 1060 may include system libraries 1061, such as a C standard library. The system libraries 1061 may provide functions such as memory allocation functions, string manipulation functions, mathematical functions, and the like.

In addition, the libraries 1060 may include API libraries 1062 and other libraries 1063. The API libraries 1062 may include media libraries, such as libraries to support presentation and manipulation of various media formats such as MPREG4, H.264, MP3, AAC, AMR, JPG, and PNG. The API libraries 1062 may also include graphics libraries, for instance an OpenGL framework that may be used to render 2D and 3D in a graphic content on the screen 1091. The API libraries 1062 may further include database libraries, for instance SQLite, which may support various relational database functions. The API libraries 1062 may additionally include web libraries, for instance WebKit, which may support web browsing functionality, and also libraries for applications 1070.

The frameworks/middleware 1068 may provide a higher-level common infrastructure that may be used by the applications 1070 and/or other software components/modules. For example, the frameworks/middleware 1068 may provide various Graphic User Interface (GUI) functions, high-level resource management, high-level location services, and so forth. The frameworks/middleware 1068 may provide a broad spectrum of other APIs that may be used by the applications 1070 and/or other software components/modules, some of which may be specific to the OS 1050 or to a platform.

The application programs 1070 are also known more simply as applications and apps. One such app is a browser 1071, which is a software that can permit the user 192 to access other devices in the internet, for example while using a Graphic User Interface (GUI). The browser 1071 includes program modules and instructions that enable the computer system 1095 to exchange network messages with a network, for example using Hypertext Transfer Protocol (HTTP) messaging.

The application programs 1070 may include one or more custom applications 1074, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 1070 may include a contacts application, a book reader application, a location application, a media application, a messaging application, and so on. Applications 1070 may be developed using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 1070 may use built-in functions of the OS 1050, of the libraries 1060, and of the frameworks/middleware 1068 to create user interfaces for the user 192 to interact with.

The computer system 1095 moreover includes a bus bridge 1020 coupled to the system bus 1012. The computer system 1095 furthermore includes an input/output (I/O) bus 1021 coupled to the bus bridge 1020. The computer system 1095 also includes an I/O interface 1022 coupled to the I/O bus 1021.

For being accessed, the computer system 1095 also includes one or more Universal Serial Bus (USB) ports 1029. These can be coupled to the I/O interface 1022. The computer system 1095 further includes a media tray 1026, which may include storage devices such as CD-ROM drives, multi-media interfaces, and so on.

The computer system 1090 may include many components similar to those of the computer system 1095, as seen in FIG. 10. In addition, a number of the application programs may be more suitable for the computer system 1090 than for the computer system 1095.

The computer system 1090 further includes peripheral input/output (I/O) devices for being accessed by a user more routinely. As such, the computer system 1090 includes a screen 1091 and a video adapter 1028 to drive and/or support the screen 1091. The video adapter 1028 is coupled to the system bus 1012.

The computer system 1090 also includes a keyboard 1023, a mouse 1024, and a printer 1025. In this example, the keyboard 1023, the mouse 1024, and the printer 1025 are directly coupled to the I/O interface 1022. Sometimes this coupling is via the USB ports 1029.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 1094.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Operational examples and sample use cases are possible where the attribute of an entity is any one of its name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances.

Figure 11:
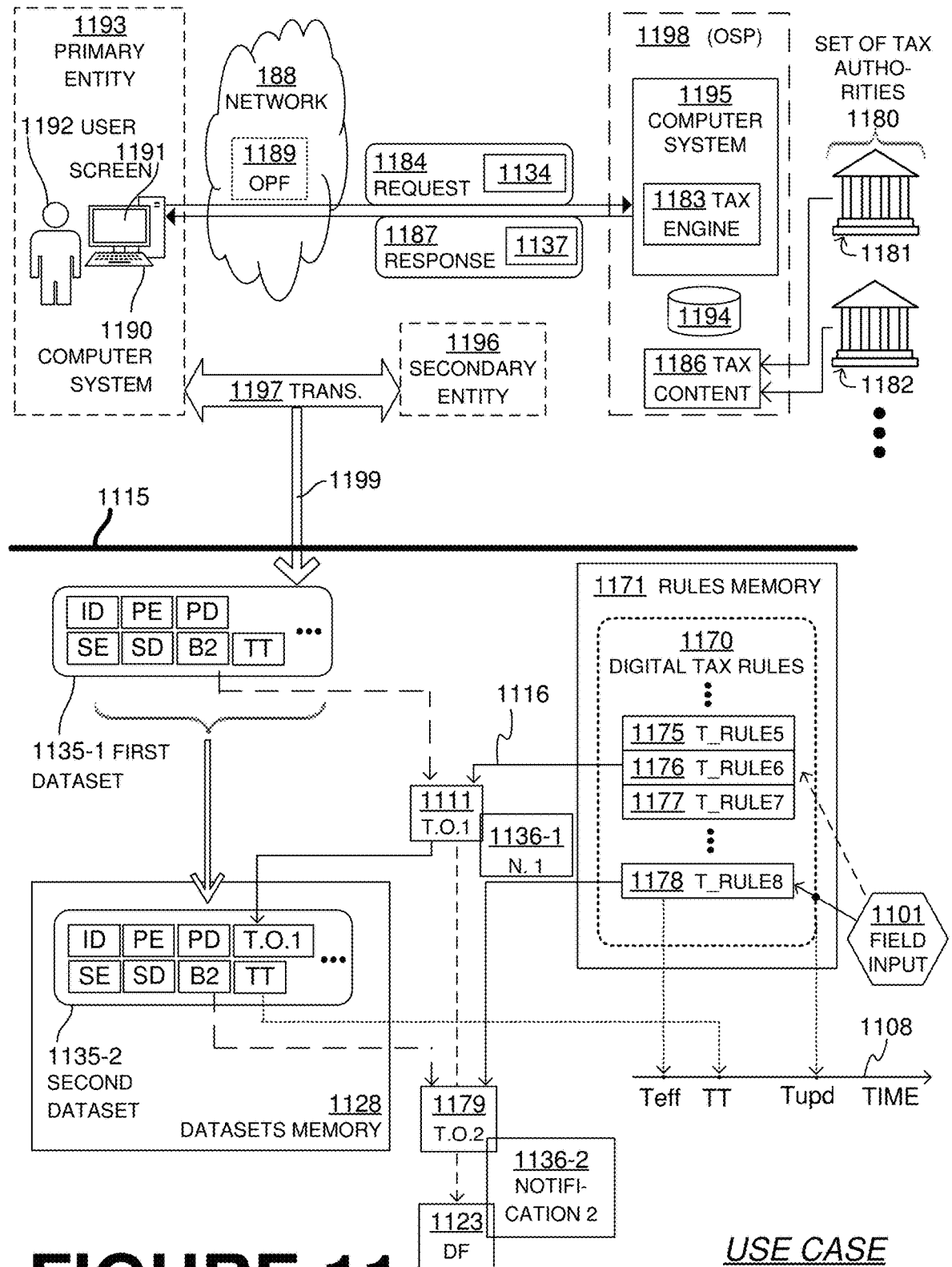
FIG. 11 is a diagram of a sample aspects for describing an operational example and use case of embodiments.

FIG. 11 is diagram for an operational example and use case where the resource is a first tax obligation (T.O. 1) 1111 of a primary entity 1193 and/or a secondary entity 1196, due to a transaction 1197. The transaction 1197 is an example of a relationship instance between the primary entity 1193 and the secondary entity 1196. In this operational example and use case, a second tax obligation (T.O.2) 1179 is also produced. In addition, a second notification 1136-2 is also caused to be transmitted to provide a corrective tax notification to a content of the first tax notification (N. 1) 1136-1, where the error in the content may have been due to a delay or error in updating tax content due to a field input 1101.

It will be recognized that aspects of FIG. 11 have similarities with aspects of FIG. 1. Portions of such aspects may be implemented as described for analogous aspects of FIG. 1. In particular, a thick line 1115 separates FIG. 11, although not completely or rigorously, into a top portion and a bottom portion. Above the thick line 1115 the emphasis is mostly on entities, components, their relationships, and their interactions, while below it the emphasis is mostly processing of data that takes place often within one or more of the components above.

Above the thick line 1115, a computer system 1195 is shown, which is used to help customers, such as a user 1192, with tax compliance. Further in this example, the computer system 1195 is part of an OSP 1198 that is implemented as a Software as a Service (SaaS) provider, for being accessed by the user 1192 online. Alternately, the functionality of the computer system 1195 may be provided locally to a user.

The user 1192 may be standalone. The user 1192 may use a computer system 1190 that has a screen 1191. In embodiments, the user 1192 and the computer system 1190 are considered part of the primary entity 1193, which is also known as entity 1193. The primary entity 1193 can be a business, such as a seller of items, a reseller, a buyer, and so on. In such instances, the user 1192 can be an employee, a contractor, or otherwise an agent of the entity 1193. In use cases the entity 1193 is a seller, and the secondary entity 1196 is a buyer, and together they are performing the buy-sell transaction 1197. The buy-sell transaction 1197 may involve an operation, such as an exchange of data to form an agreement. This operation can be performed in person, or over the network 188, etc. In such cases the entity 1193 can even be an online seller, but that is not necessary.

The transaction 1197 will have data that is known to the entity 1193, similarly with what was described by the arrow 197 of FIG. 1.

In a number of instances, the user 1192 and/or the entity 1193 use software applications to manage their business activities, such as sales, resource management, production, inventory management, delivery, billing, and so on. The user 1192 and/or the entity 1193 may further use accounting applications to manage purchase orders, sales invoices, refunds, payroll, accounts payable, accounts receivable, and so on. Such software applications, and more, may be used locally by the user 1192, or from an Online Processing Facility (OPF) 1189 that has been engaged for this purpose by the user 1192 and/or the entity 1193. In such use cases, the OPF 1189 can be a Mobile Payments system, a Point Of Sale system, an Accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. Tax jurisdictions are defined most frequently by geography. There are various tax authorities, such as that of a state, of a city, of a municipality and so on. So, for example, when a business sells items in transactions that can be taxed by a tax authority, the business may have the tax obligations to the tax authority. These obligations include for the business to a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, c) file the tax return with the tax authority by a deadline determined by the tax authority, and f) pay ("remit") that amount of money to the tax authority, the filing and paying to be made by a frequency and deadlines determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and such errors are plain not good. For example, businesses that sell products and services have risks whether they over-estimate or under-estimate the sales tax due from a sale transaction. On the one hand, if a seller over-estimates the sales tax due, then the seller collects more sales tax from the buyers than was due. The seller should not keep this surplus sales tax, but instead pay it to the tax authorities. If a buyer later learns that he paid unnecessarily more sales tax than was due, the seller risks harm at least to their reputation. The buyer will have the option, sometimes, to ask the state for a refund of the excess tax by sending an explanation and the receipt, but that is often not done as too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse.

Tax-related determinations, made for the ultimate purpose of tax compliance, arc challenging because the underlying tax rules are very complex. There are various types of tax, such as sales tax, use tax, excise tax, payroll tax, value-added tax, cross-border tax that includes customs and duties, and many more. Some types of tax are industry-specific. Each type of tax has its own set of rules. Additionally, tax rules and rates change often, and new tax rules are continuously added. Moreover, a taxing authority may offer a tax holiday during which certain taxes are waived temporarily, which further complicates tax compliance.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be hard to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical *nexus*. However, a tax authority such as a state or even a city may set its own *nexus* rules for when a business is considered to be "engaged in business" with it, and therefore that business is subject to registration and collection of sales taxes. These *nexus* rules may include different types of *nexus*, such as affiliate *nexus*, click-through *nexus*, cookie *nexus*, economic *nexus* with thresholds, and so on. For instance, due to economic *nexus*, a remote seller may owe sales tax for sales made in the jurisdiction that are a) above a set threshold volume, and/or b) above a set threshold number of sales transactions.

Lastly, even where a seller might not have reached any of the thresholds for economic *nexus*, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state.

The situation becomes even more complex when a seller sells directly to a state, and also via such an intermediary.

To help with such complex determinations, the computer system 1195 may be specialized for tax compliance. The computer system 1195 may have one or more processors and memory, for example as was described for the computer system 195 of FIG. 1. The computer system 1195 thus implements a tax engine 1183 to make the determinations of tax obligations. The tax engine 1183 can be as described for the service engine 183.

The computer system 1195 may further store locally entity data, i.e. data of user 1192 and/or of entity 1193, either of which/whom may be a customer, and/or a seller or a buyer in a sales transaction. The entity data may include profile data of the customer, and transaction data from which a determination of a tax obligation is desired. In the online implementation of FIG. 11, the OSP 1198 has a database 1194 for storing the entity data. This entity data may be inputted by the user 1192, and/or caused to be downloaded or uploading by the user 1192 from the computer system 1190 or from the OPF 1189, or extracted from the computer system 1190 or from OPF 1189, and so on. In other implementations, a simpler memory configuration may suffice for storing the entity data.

A tax content 1186 is further implemented within the OSP 1198. The tax content 1186 can include a utility such as a rules memory 1171. The rules memory 1171 stores digital tax rules 1170 for use by the tax engine 1183. As part of managing tax content 1186, there may be continuous updates of the digital tax rules, by inputs gleaned from a set 1180 of different tax authorities 1181, 1182, . . . , such as a rate change for a jurisdiction, a condition change for a jurisdiction, that a location has changed jurisdiction and therefore its rate or rule has changed indirectly, and so on. Updating may be performed by humans, or by computers, and so on. As mentioned above, the number of the different tax authorities in the set 1180 may be very large. The tax rules that the different tax authorities in the set 1180 write are in human-readable form, in text.

For a specific determination of a tax obligation, the computer system 1195 may receive one or more datasets. A sample received first dataset 1135-1 is shown just below line 1115, which can be similar to what was described for the first dataset 135-1 of FIG. 1. In this example, the computer system 1190 transmits a request 1184 that includes a payload 1134, and the first dataset 1135-1 is received by the computer system 1195 parsing the received payload 1134. In this example the single payload 1134 encodes the entire first dataset 1135-1, but that is not required, as mentioned earlier.

In this example, the first dataset 1135-1 has been received because it is desired to determine any tax obligations arising from the buy-sell transaction 1197. As such, the sample received first dataset 1135-1 may represent a sales transaction record and has values that characterize attributes of the buy-sell transaction 1197, as indicated by an arrow 1199. (It should be noted that the arrow 1199 describes a correspondence, but not the journey of the data of the buy-sell transaction 1197 in becoming the received first dataset 1135-1.) Accordingly, in this example the sample received first dataset 1135-1 has a value ID for an identity of the first dataset 1135-1 and/or the transaction 1197. The first dataset 1135-1 also has a value PE for the name of the primary entity 1193 or the user 1192, which can be the seller making sales transactions, some online. The first dataset 1135-1 further has a value PD for relevant data of the primary entity 1193 or the user 1192, such as an address, place(s) of business, prior *nexus* determinations with various tax jurisdictions, and so on. The first dataset 1135-1 also has a value SE for the name of the secondary entity 1196, which can be the buyer. The first dataset 1135-1 further has a value SD for relevant data of the secondary entity 1196, entity-driven exemption status, and so on. The first dataset 1135-1 has a value B2 for the sale price of the item sold. The first dataset 1135-1 may further have additional values, as indicated by the ellipsis in the first dataset 1135-1. These values may characterize further attributes, such as what item was sold, for example by a Stock Keeping Unit (SKU), how many units of the item were sold, a date and possibly also time of the transaction 1197, and so on. The first dataset 1135-1 also has transaction time data (TT) indicative of a time associated with the associated transaction (e.g., a time the transaction happened, a time a tax for the transaction was requested, and so on).

The digital tax rules 1170 have been created so as to accommodate tax rules that the set 1180 of different tax authorities 1181, 1182 . . . promulgate within the boundaries of their tax jurisdictions. In FIG. 11, at least four sample digital tax rules are shown, namely T_RULE5 1175, T_RULE6 1176, T_RULE7 1177 and T_RULE8 1178 that is inserted responsive to the field input 1101. Additional digital tax rules 1170 are suggested by the vertical dot-dot-dots.

Similarly with FIG. 1, some of these digital tax rules may be digital main rules that determine the first tax obligation 1111, while others can be digital precedence rules that determine which of the digital main rules is to be applied in the event of conflict. In some use cases, digital main rules may be about a sales tax or use tax being owed due to the transaction 1197 at a certain percentage of the purchase price. Digital precedence rules may be digital tax rules that determine whether digital tax rules is to be applied for origin-based or destination-based jurisdictions, how to override for diverse taxability of individual items, for temporary tax holidays, for exemptions from having to pay sales tax based on who the buyer is, and also based on *nexus*, and so on.

Similarly with FIG. 1, these digital tax rules 1170 can be implemented or organized in different ways. In some use cases they can be organized with conditions and consequents, such as was described earlier in this document. Such conditions may relate to geographical boundaries, effective dates, and so on, for determining where and when a digital tax rule is to be applied. These conditions may be expressed as logical conditions with ranges, dates, other data, and so on. Values of the first dataset 1135-1 can be iteratively tested against these logical conditions. In such cases, the consequents may indicate one or more tax obligations, such as to indicate different types of taxes that are due, rules, rates, exemption requirements, reporting requirements, remittance requirements, etc.

In this example, a first digital tax rule T_RULE6 1176 is shown as identified and used, which is indicated also by the beginning of an arrow 1116. Identifying may be performed responsive to the values of the first dataset 1135-1, which are shown as considered for digital tax rules 1170. For example, it may be recognized that a first condition of the first digital tax rule T_RULE6 1176 is met by one or more of the values of the first dataset 1135-1). For instance, it can be further determined that, at the time of the sale, the buyer 1196 is located within the boundaries of a tax jurisdiction, that the seller 1193 has *nexus* with that tax jurisdiction, and that there is no tax holiday.

As such, the computer system 1195 may produce the first tax obligation 1111, which is akin to producing the first resource (R1) 111 of FIG. 1. The first tax obligation 1111 can be produced by the computer system 1195 applying the first digital tax rule T_RULE6 1176, as indicated by the arrow 1116. In this example, the consequent of the identified first digital tax rule T_RULE6 1176 may specify that a sales tax is due, the amount is to be determined by a multiplication of the sale price of the value B2 by a specific rate, the tax return form that needs to be prepared and filed, a date by which it needs to be filed, and so on.

The computer system 1195 may then cause a first notification 1136-1 to be transmitted. The first notification 1136-1 can be about an aspect of the first tax obligation 1111, similarly with the first notification 136-1 of FIG. 1 being about an aspect of the first resource (R1) 111. In the example of FIG. 11, the first notification 1136-1 is caused to be transmitted by the computer system 1195 as an answer to the received first dataset 1135-1. The first notification 1136-1 can be about an aspect of the first tax obligation 1111. In particular, the first notification 1136-1 may inform about the aspect of the first tax obligation 1111, namely that it has been determined, where it can be found, what it is, or at least a portion or a statistic of its content, and so on.

The first notification 1136-1 can be transmitted to one of an output device and another device that can be the remote device, from which the first dataset 1135-1 was received. The output device may be the screen of a local user or a remote user. The first notification 1136-1 may thus cause a desired image to appear on the screen, such as within a Graphical User Interface (GUI) and so on. The other device may be a remote device, as in this example. In particular, the computer system 1195 causes the first notification 1136-1 to be communicated by being encoded as a payload 1137, which is carried by a response 1187. The response 1187 may be transmitted via the network 188 responsive to the received request 1184. The response 1187 may be transmitted to the computer system 1190, or to OPF 1189, and so on. As such, the other device can be the computer system 1190, or a device of the OPF 1189, or the screen 1191 of the user 1192, and so on. In this example the single payload 1137 encodes the entire first notification 1136-1, but that is not required, similarly with what is written above about encoding datasets in payloads. Along with the aspect of the first tax obligation 1111, it is advantageous to embed in the payload 1137 the ID value and/or one or more values of the first dataset 1135-1. This will help the recipient correlate the response 1187 to the request 1184, and therefore match the received aspect of the first tax obligation 1111 as the answer to the received first dataset 1135-1.

The computer system 1195 may then store a second dataset 1135-2 (e.g., a second sales transaction record) in a datasets memory 1128. This is similar to the computer system 195 storing the second dataset 135-1 in the datasets memory 128 of FIG. 1. The second dataset 1135-2 includes one or more values derived from the values of the first dataset 1335-1. As shown in this example, all of ID, PE, PD, SE, SD can optionally be included, although this is not required. The second dataset 1135-2 also has a first new value encoding a parameter of the first tax obligation (T.O.1) 1111, which is akin to a parameter of R1 of FIG. 1. In the example of FIG. 11, the second dataset 1135-2 stores the numerical value T.O. 1111, the sale price of the item sold (B2), or in this example optionally both B2 and R1. The second dataset also has transaction time data (TT) that may be identical to or otherwise derived from the TT of the first dataset 135-1.

As previously mentioned, one or more of the tax authorities 1180 may periodically update or change one or more tax rules. Such changes can include updating a tax rate, adding a tax holiday, changing how an item is taxed (e.g., how it is classified), adding a new jurisdiction, changing the boundary of a jurisdiction, and so on. The OSP 1198 may learn of such changes through being notified by the tax authorities, independent research, or otherwise.

A field input 1101 may be generated responsive to the change in the tax rules by the one or more of the tax authorities 1180. The field input 1101 can have the intent that the digital tax rules be adjusted so that they generate results in accordance with the changed tax rules. In terms of implementation, the field input 1101 may be for use by a human operator, or directly for consumption by a computer system, as described below. The computer system 1195 may receive a field input 1101 associated with the change to the one or more tax rules after storing the second dataset 1135-2. This is similar to the computer system 195 receiving the field input 101 in FIG. 1. The field input 1101 may be received from a user of the computer system 1195, from OSP 1198, from another computer system, a network, or another entity. As a result, the computer system 1195 may store a second digital tax rule T_RULE8 1178 in the tax rules memory 1171, at an updating time (Tupd). This is similar to the computer system 195 storing the second digital main rule M_RULE8 178 in the rules memory 171 in FIG. 1. The second digital tax rule may have a second tax condition and a second tax consequent associated with the second tax condition. In some cases, the storage of the second digital tax rule T_RULE8 1178 may include storing adding a new digital tax rule to the rules memory 1171, and in some cases optionally removing the first digital tax rule T_RULE6 1176 or the second digital tax rule T_RULE8 1178 take precedence. In other cases, the storage of the second digital tax rule T_RULE8 1178 may include changing the first digital tax rule T_RULE6 1176 to create the second digital main rule M_RULE8 178, similarly to what was described above for FIG. 7.

The computer system 1195 may input an effective time (Teff) at which the second digital tax rule T_RULE8 1178 replaces the first digital tax rule T_RULE6 1176, responsive to the received field input 1101. This is similar to the computer system 195 inputting the Teff at which the second digital main rule M_RULE8 178 replaces the first digital main rule M_RULE6 176 in FIG. 1. In some embodiments, the Teff may represent the time that one or more of the tax authorities 1180 legislate, mandate, or otherwise intend the second digital tax rule T_RULE8 1178 to take effect. The Teff may be input as part of the second digital main rule T_RULE8 1178 (e.g., as part of a tax condition), as part of the field input 1101, and so on.

A sample time axis 1108 shows that, in some embodiments, the Tupd may occur after the Teff. Also, a transaction time (TT) may occur after the Teff but prior to the Tupd. As a result, the computer system 1195 may have produced the first tax obligation 1111 for the first dataset 1135-1 to have an inaccuracy or inconsistency with the second digital main rule M_RULE8 178. Moreover, as described above, the computer system 1195 may already have caused the first notification 1136-1 to be transmitted about the aspect of the tax obligation 1111. This may also have happened for additional tax obligations produced for other datasets similarly to what was described for FIGS. 4 and 5. Such inaccuracies or inconsistencies can cause the entity 1193 to have liability due to underpaying their taxes or erroneously overpaying their taxes. The discussion below describes embodiments to correct such erroneously provided tax obligation information, at lease at certain times or under certain conditions.

The computer system 1195 may recognize that the second tax condition of the second digital tax rule T_RULE8 1178 is met by at least one of the values of the stored second dataset 1135-2. This is similar to the computer system 195 recognizing that the second condition (CN8) of M_RULE8 178 is met by at least one of the values of the second dataset 135-2. This may also be done in a way similar to what was described for FIG. 2.

The computer system 1195 may produce a second tax obligation (T. O. 2) 1179 for the second dataset 1135-2 by applying the second tax consequent of the second digital tax rule T_RULE8 1178, responsive to the TT occurring after the Teff but prior to the Tupd. This is similar to the computer system 195 producing the second resource (R2) 179 for the second dataset 135-2 by applying the second consequent (CT8) of the second digital main rule M_RULE8 178. The second tax obligation 1179 may be distinct from the first tax obligation 1111 (e.g., have a different numerical value). By way of example, this may be due to the second tax consequent having an updated or different sales tax rate applicable to the transaction, an updated or different way the sales tax is to be computed for an item identified in the transaction, differently applying a tax holiday (e.g., adding or removing the tax holiday) applicable to the transaction, adding a new jurisdiction with an associated tax and needing to add the associated tax to the prior tax obligation, or the like.

The computer system 1195 may then cause a second notification (notification 2) 1136-2 to be transmitted about an aspect of the second tax obligation 1179 to a third remote device via the network 188. This is similar to the computer system 195 causing the second notification 136-2 to be transmitted about an aspect of the second resource 179 to the third remote device via the network 188. In some embodiments, the computer system 1195 may identify contact information associated with the entity 1193 in the database 1194, and use the contact information to direct the second notification 1136-2. In some embodiments, the notification may inform the entity 1193 that an error exists in the previously transmitted first tax obligation 1111, and in some cases may provide information that quantifies or allows quantification of the magnitude of the error. In various embodiments, the second notification 1136-2 may be about the second tax obligation 1179, about a difference between numerical values of the first tax obligation 1111 and the second tax obligation 1179, rounded versions of such values, where such values can be found, etc.

In some embodiments, the second notification 1136-2 may optionally provide the entity 1193 with one or more options to request a corrective action. For example, the options may be presented on a graphic user interface (GUI), and the user 1192 may be able to select the options to request the corrective action. In various embodiments, the corrective action may be refile a tax filing with a correction or adjustment, pay an additional amount if there was an underpayment (e.g., pay an additional sales tax), request a refund if there was an overpayment (e.g., request at least a partial refund for an already paid sales tax), and so on. In such embodiments, the computer system 1195 may receive the request from the entity 1193 take corrective action. Advantageously, taking such corrective actions may help to reduce the liability of the entity 1193 for inaccurate tax computations for taxes such as sales tax, use tax, excise tax, payroll tax, value-added tax, cross-border tax that includes customs and duties, and many more.

Similarly with what was described above for FIGS. 8 and 9, in some embodiments, the computer system 1195 may determine whether one or more non-notification conditions are met to determine whether to cause the second notification 1136-2 to be transmitted. In some embodiments, this determination may be based on one or more thresholds. For example, the second notification 1136-2 may be selectively provided if the total amount of underpayment or overpayment is greater than a threshold (e.g., a monetary amount, a certain fraction of the reported sales tax, and so on). In other embodiments, the provision of the second notification 1136-2 may be selectively enabled or disabled for certain jurisdictions or countries. In still other embodiments, the provision of the second notification 1136-2 may be used in all cases to notify about increased tax liability, but notification of decreased tax liability may be an add-on feature, only for entities with a certain transaction volume, and so on.

Figure 12:
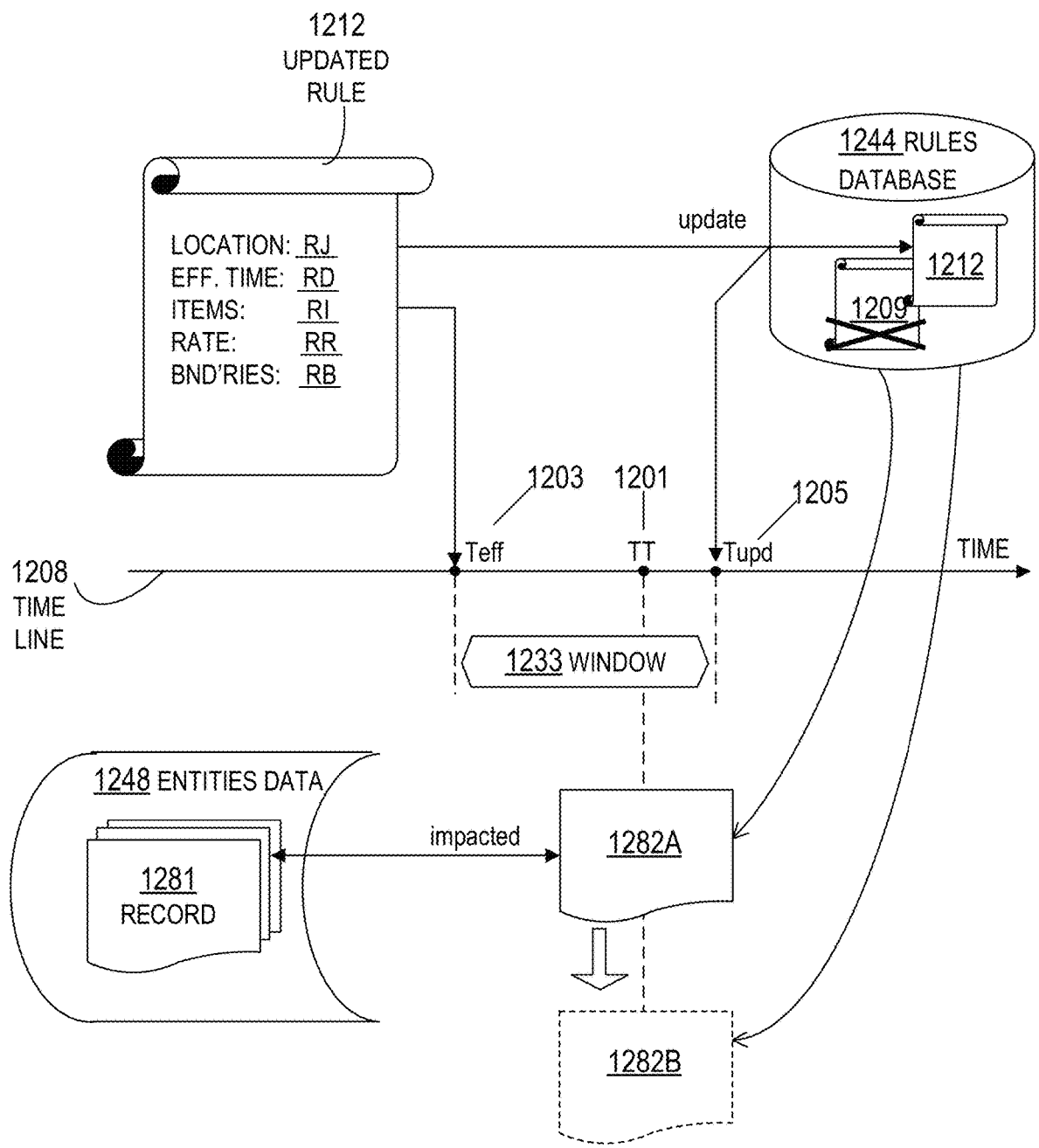
FIG. 12 is a composite diagram of a sample interaction of elements for describing operational examples and use case of embodiments.

FIG. 12 is a composite diagram of a sample interaction of elements for describing operational examples and use case of embodiments. A rules database 1244, which represents one embodiment of rules memory 1171 of FIG. 11, is used to store digital tax rules. Initially, a first digital tax rule 1209 is stored in the rules database 1244. An entities data database 1248, which may be an embodiment of the database 1194 of FIG. 11, stores transaction records, including a transaction record 1281 and a transaction record 1282A.

At an updating time (Tupd), a computer system may store a second updated digital tax rule 1212 in the rules database 1244, and in this example may remove the first digital tax rule 1209 from the rules database 1244. The second digital tax rule 1212 may have a condition and a consequent expressed via a number of values. In the illustrated example, these values include a value RJ to indicate a location, a value RD to indicate an effective time (Teff) at which the updated digital tax rule 1212 is initially intended to replace the first digital tax rule 1209, a value RI to indicate item(s) implicated by the updated digital tax rule 1212, a value RR to indicate a tax rate, and a value RB to indicate one or more tax boundaries.

A time line 1208 shows that the Teff 1203 may occur prior to the Tupd 1205. In other words, the update actually took place at the updating time Tupd 1205, which is later than the intended time Teff. A window 1233 is defined between the Teff and the Tupd. The computer system may use this window to identify impacted transaction records due to the delay in the intended update.

For example, the transaction record 1282A may be identified as an impacted transaction record or document that is for a transaction occurring within the window 1233. More specifically, the transaction record 1282A may have an associated transaction time (TT) 1201 occurring after the Teff but prior to the Tupd. As a result, the first digital tax rule 1209 may have been used to produce a first tax obligation for the transaction record 1282A that incorporates an inaccuracy, inconsistency, or error due to using the first digital tax rule 1209 instead of the second digital tax rule 1212. Communicating the content of the transaction record 1282A, such as with a first notification, is not depicted in FIG. 12. In some embodiments, an updated transaction record 1282B may optionally be derived from the first transaction record and applying the second updated digital tax rule 1212. Then a second notification—not shown in FIG. 12-would communicate the updated content of the updated transaction record 1282B. More particular examples of such transaction records are now described.

Figure 13:
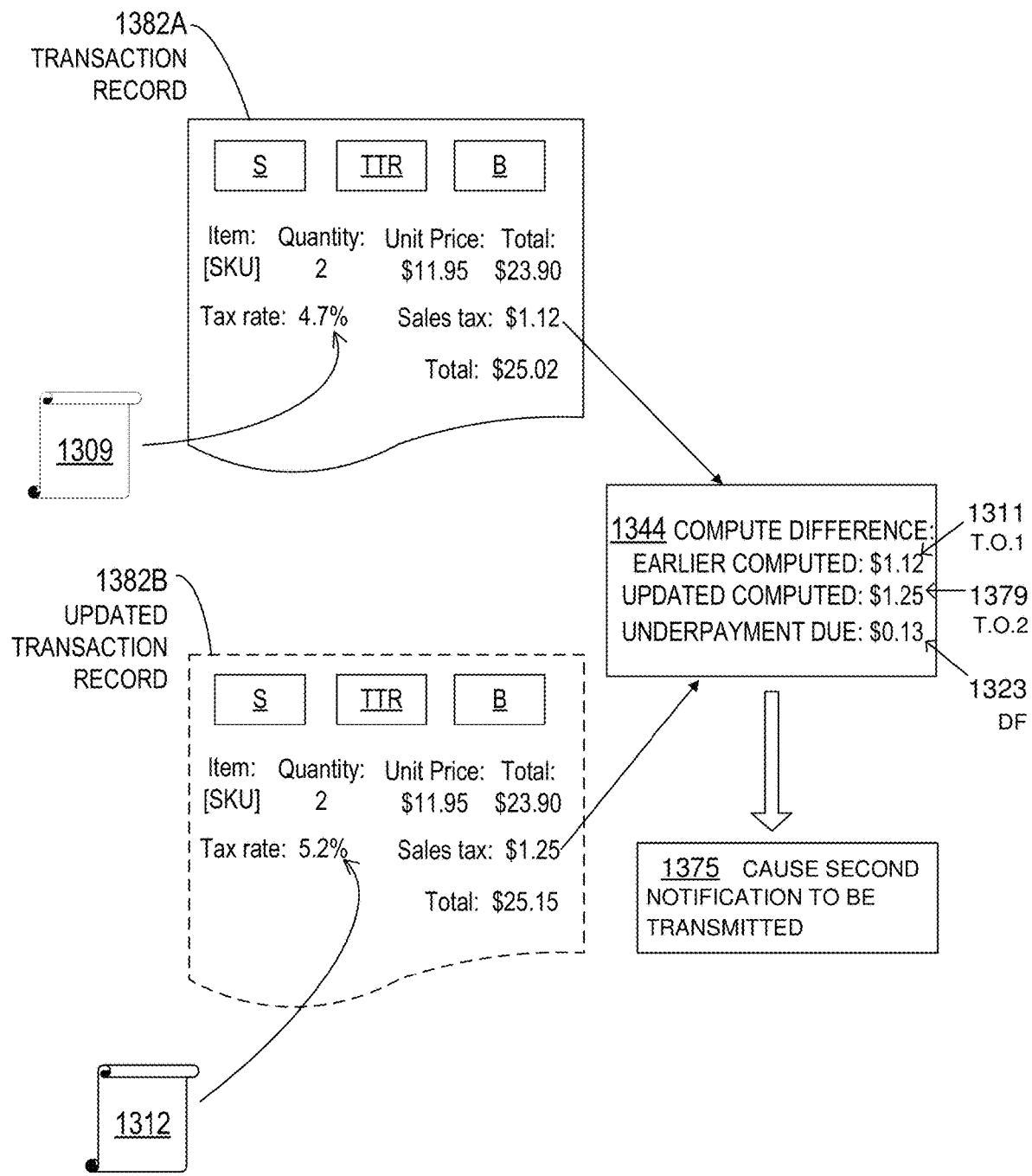
FIG. 13 is a composite diagram of a sample determination of a difference that causes a notification to be transmitted in an operational example and use case of embodiments.

FIG. 13 is a composite diagram of a sample determination of a difference that causes a notification to be transmitted in an operational example and use case of embodiments. This operational example and use case are based on sales tax computed for a sales transaction.

A transaction record 1382A identifies a seller(S), a buyer (B), and a transaction time data (TTR), and other sample values shown. The transaction record 1382A has been created based on a first digital tax rule 1309. In particular, the first digital tax rule 1309 specifies (e.g., by its consequent) that a tax rate of 4.7% is to be applied to a total value before tax of $23.90 to produce a first sales tax of $1.12. This first sales tax is first tax obligation (T.O. 1) 1311, which is a specific example of the first tax obligation 1111 of FIG. 11.

The computer system may generate an updated transaction record 1382B. The updated transaction record 1382B may repeat some of the information from the transaction record 1382A. The updated transaction record 1382B has been created based on a second digital tax rule 1312. In particular, the second digital tax rule 1312 specifies (e.g., by its consequent) that a tax rate of 5.2%, which is increased from the tax rate of 4.7% of the transaction record 1382A, is to be applied to the total value before tax of $23.90 to produce an updated or second sales tax of $1.25. This second sales tax is a second tax obligation (T.O. 2) 1379, which is a specific example of the second tax obligation 1179 of FIG. 11.

According to an operation 1344, the computer system may compute a difference (DF) 1323 between the earlier computed first sales tax of $1.12, and the computed second sales tax of $1.25, as an underpayment due of $0.13. According to an operation 1344, the computer system may cause a second notification to be transmitted about an aspect of the second tax obligation (T.O. 2) 1379. The second notification may be about an increased tax liability of the second tax obligation 1379 relative to the first tax obligation 1311, for example reporting the underpayment, due to the sales tax rate increase from 4.7% to 5.2%. This second notification may be caused to be transmitted per operation 1375, for example as previously described.

Figure 14:
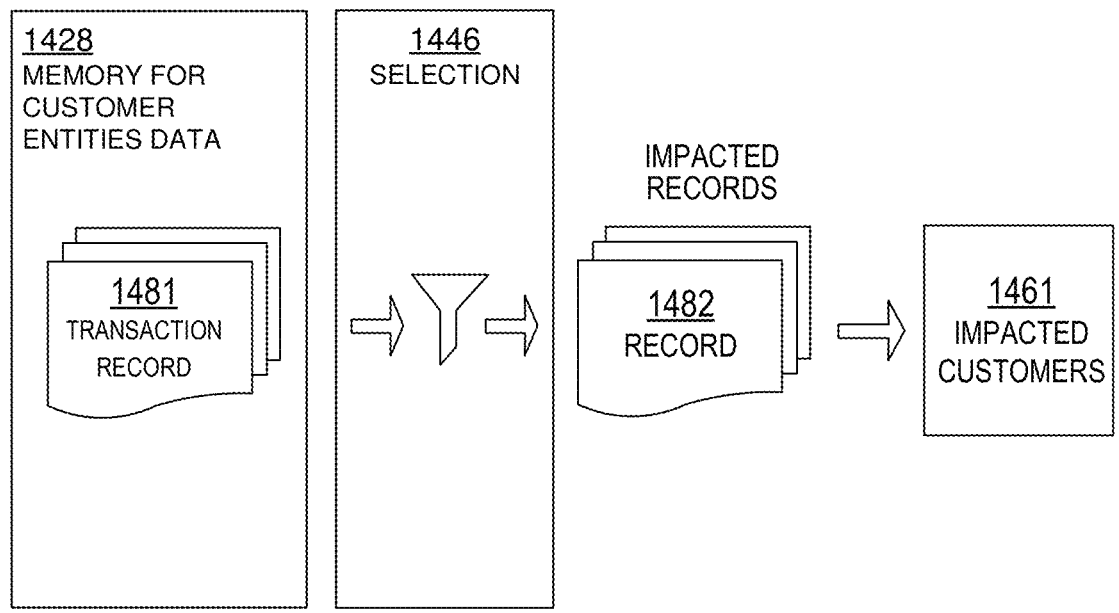
FIG. 14 is a composite diagram of a sample interaction of elements for describing operational examples and use case of embodiments.

FIG. 14 is a composite diagram of a sample interaction of elements for describing operational examples and use case of embodiments. A memory for customer entities data 1428 stores transaction records, including transaction records 1481, 1482, and others. The memory 1428 may be memory of the computer system 1195, network connected memory, and so on.

A selection module 1446 of a computer system may select impacted records, including an impacted record 1482 and others. In some embodiments, the selection module may search the transaction records in the memory 1428 and select transaction records for a tax jurisdiction implicated by a field input and transactions that according to transaction time data (TTR) indicated in the transaction records are for transactions that occurred at times within a window defined between a Teff and a Tupd as the impacted transaction records.

The computer system may identify impacted customers 1461 (e.g., impacted sellers) corresponding to the impacted transaction records. In some embodiments, the identified impacted customers may be notified about the impacted transaction records and/or the associated transactions, as described elsewhere herein. In some instances, their notifications may be about aggregate tax liability, and so on.

FIG. 15 is a flowchart for illustrating sample methods for operational examples and use cases. The method 1500 may be performed by a computer system, such as one of the computer systems 195 of FIG. 1, 1195 of FIG. 11, 1095 of FIG. 10, or another suitable computer system.

According to an optional operation 1520, the computer system may receive a field input about a tax jurisdiction. According to an operation 1530, the computer system may identify an earlier-stored first digital tax rule about the tax jurisdiction that is impacted by the field input. According to an operation 1540, the computer system may update the first digital tax rule with a second digital tax rule at an updating time (Tupd). According to an operation 1550, the computer system may input an effective time (Teff) at which the second digital tax rule is to apply and/or replace the first digital tax rule. The operations 1520, 1530, 1540, and 1550 may be similar to those previously described. In some embodiments, the operations 1530, 1540, and 1550 may be performed responsive to receiving the field input.

According to an operation 1554 of method 1500, the computer system may determine whether the Teff is less than the Tupd. If the Teff is not less than the Tupd (i.e., "NO" is the determination), then according to a subsequent operation 1556 the method 1500 may exit. Alternatively, if the Teff is less than the Tupd (i.e., "YES" is the determination), then according to an operation 1560, the computer system may identify a time window defined between the Teff and the Tupd.

According to an operation 1570, the computer system may search stored customer data. For example, transaction records or other datasets may be searched. As previously mentioned, in some embodiments, these transaction records or other datasets may store transaction time data (e.g., the T2 in the second dataset 135-2 of FIG. 1, the TTR in the transaction record 1382A of FIG. 13).

According to an operation 1573, the computer system may discover, pursuant to the search, one or more impacted transaction(s) occurring within the time window. In some embodiments, the transaction time data in the transaction records may be examined to determine whether the associated transaction occurred at a time within the time window (e.g., after the Teff but prior to the Tupd). Also, in some embodiments, other data in the transaction records may be examined to determine whether the transaction is one for which the tax jurisdiction implicated by the received field input applies.

As previously mentioned, for these impacted transactions, the computer system had previously produced a first tax obligation by applying the earlier-stored first digital tax rule, and had caused a first notification about an aspect of the first tax obligation to be transmitted to an associated entity. According to an operation 1577, the computer system may compute an updated tax obligation or liability by applying the second digital tax rule.

According to an operation 1584, the computer system may determine whether a non-notification condition is met. The previously described types of non-notification events are suitable. If the non-notification condition is met (i.e., "YES" is the determination), then according to the operation 1556 the method 1500 may exit. Alternatively, if the non-notification condition is not met (i.e., "NO" is the determination), then according to an operation 1588 the computer system may cause a corrective tax notification (e.g., information about an aspect of the updated tax obligation, a difference between the first and updated tax obligations, where such information can be found, etc.) to be transmitted to customer(s) of the impacted transaction(s).

FIG. 16 is a flowchart for illustrating sample methods for operational examples and use cases. The method 1600 may be performed by a computer system, such as one of the computer systems 195 of FIG. 1, 1195 of FIG. 11, 1095 of FIG. 10, or another suitable computer system.

Operations 1620, 1630, 1640, 1650, 1654, 1660, and 1656, respectively, may be performed similarly to operations 1520, 1530, 1540, 1550, 1554, 1560, and 1556 of FIG. 15.

According to an operation 1670, a computer system may select a next customer. For example, the OSP 1198 may provide services for a number of customers and the method 1600 may be performed for at least some of the customers or for each of them responsive to the field input being received at operation 1620. By way of example, operation 1670 can be where the computer system 1195 proceeds one-by-one through customer profiles in the database 1194, to select the next customer.

According to an operation 1672, the computer system may determine whether the selected customer sells products or services in the tax jurisdiction that the field input is about, or is affected by the updated stored rule. By way of example, the computer system 1195 may examine the customer profile for the selected customer or examine transaction records to make this determination. If the customer does not sell in the tax jurisdiction (i.e., "NO" is the determination), then the method may return to operation 1670, from where the next customer may be selected.

Alternatively, if the customer does sell in the tax jurisdiction (i.e., "YES" is the determination), then according to the operation 1674 the computer system may determine whether the customer has a *nexus* with the tax jurisdiction. If the customer does not have a *nexus* with the tax jurisdiction (i.e., "NO" is the determination), then the method may return to operation 1670 where another customer may be selected. There can be different types of *nexus*, as mentioned above, and determinations as described with reference to FIG. 9.

Alternatively, if the customer does have a *nexus* with the tax jurisdiction (i.e., "YES" is the determination), then according to the operation 1676, the computer system may discover one or more impacted or candidate transaction(s) occurring within the time window. By way of example, the computer system 1195 may access and examine all the transaction records for the selected customer to make this determination.

According to an operation 1677, the computer system may compute an updated tax obligation or liability for the discovered impacted transactions. In some cases, a separate updated tax obligation may be produced for each of the impacted transaction(s). In other cases, a single updated tax obligation may be produced that combines the updated tax obligations for multiple of the impacted transactions.

According to an operation 1678, the computer system may cause a corrective tax notification to be transmitted to the selected customer of the impacted or candidate transaction(s). The corrective tax notification may be about an aspect of the updated tax obligation for the impacted transaction(s). The method 1600 may then return to operation 1670 where another customer may be selected.

Other use cases are also contemplated. For example, another use case could be where it is desirable to adjust the position of a drone, satellite, or other object in space based on measurements (e.g., weather measurements, solar storms, etc.) taken into account by rules (e.g., feedback control rules), and there is delay in updating the rules to take into account changing factors, such as environmental factors. By way of example, the second notification can inform of a nudge or additional positional adjustment to be used to get the object in space back into a desired position, such as a change in wind, or air temperature or pressure.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings-which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112 (f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112 (f).

What is claimed is:

1. A method for a computer system, the method including at least:
    receiving, by the computer system from a first remote device via a network, a first dataset having values, at least one of the values characterizing an attribute of a certain entity, at least another of the values being a first time indicator (T1) indicating a first time instance for the attribute;
    accessing, by the computer system, a first digital rule having a first condition and a first consequent associated with the first condition;
    recognizing, by the computer system, that the first condition is met by at least one of the values of the first dataset;
    producing, by the computer system applying the first consequent, a first resource for the first dataset;
    causing, by the computer system, a first notification to be transmitted about an aspect of the first resource to a second remote device via the network;
    storing, by the computer system, a second dataset including: a first new value encoding a parameter for the first resource, a second new value derived from one of the values of the first dataset, and a second time indicator (T2) derived from the T1;
    storing, by the computer system at an updating time (Tupd), a second digital rule in a rules memory, the second digital rule having a second condition and a second consequent associated with the second condition, the second digital rule different from the first digital rule;
    inputting, by the computer system, an effective time (Teff) at which the second digital rule replaces the first digital rule;
    recognizing, by the computer system, that the second condition is met by at least one of the values of the stored second dataset;
    producing, by the computer system applying the second consequent, a second resource for the second dataset responsive to the T2 occurring after the Teff but prior to the Tupd, the second resource distinct from the first resource; and
    causing, by the computer system, a second notification to be transmitted about an aspect of the second resource to a third remote device via the network.

2. The method of claim 1, further including:
    receiving, by the computer system, a field input after storing the second dataset, and
    in which the second digital rule is stored responsive to the received field input.

3. The method of claim 1, in which:
    the first resource includes a computed numerical value,
    the first new value is the numerical value,
    the second new value is identical to the at least one of the values of the first dataset, and
    the T2 is the same as the T1.

4. The method of claim 1, in which:
    one of the values of the first dataset is a numerical base value, applying the first consequent includes performing a mathematical operation on the numerical base value to produce the first resource, and
    applying the second consequent includes performing the mathematical operation on the numerical base value to produce the second resource.

5. The method of claim 1, in which:
    the Teff is determined from the second digital rule.

6. The method of claim 1, further including:
    receiving, by the computer system, a field input after storing the second dataset, and
    in which: the Teff is determined from the field input.

7. The method of claim 1, in which:
    the third remote device is the same as the second remote device.

8. The method of claim 1, in which:
    the first resource includes a first numerical value,
    the second resource includes a second numerical value, and
    further including:
        computing, by the computer system, a difference between the second numerical value and the first numerical value, and in which the aspect of the second resource is about the difference.

9. The method of claim 1, further including:
selecting, by the computer system and responsive to the T2 occurring after the Teff but prior to the Tupd, a plurality of other datasets in addition to the second dataset;
producing, by the computer system applying the second consequent to the other datasets, additional resources for the other datasets, and
in which the second notification is also about an aspect of the additional resources.

10. The method of claim 9, in which:
the first dataset includes a geographical indication of the certain entity, and
the other datasets are selected on the basis of also including the geographical indication.

11. The method of claim 1, further including:
receiving, by the computer system, a field input after storing the second dataset; and
deleting, by the computer system, the first digital rule from the rules memory responsive to the received field input.

12. The method of claim 1, in which:
the second condition is the same as the first condition.

13. The method of claim 1, in which:
one of the values of the first dataset is a numerical base value that encodes an aspect of the first dataset,
applying the first consequent includes performing a mathematical operation on the numerical base value to produce the first resource,
the second new value is the numerical base value, and
applying the second consequent includes performing the mathematical operation on the second new value to produce an interim number, and
the second resource is produced by adding the first resource and the interim number.

14. The method of claim 1, further including:
determining, by the computer system, that a non-notification condition is met, the non-notification condition rendering undesirable the second notification to be transmitted; and
responsive to the determination that the non-notification condition is met, not causing the second notification to be transmitted.

15. The method of claim 14, in which:
the first resource includes a first numerical value,
the second resource includes a second numerical value,
the method further includes: computing, by the computer system, a difference between the second numerical value and the first numerical value;
determining that the difference is less than a threshold; and
in which the non-notification condition is met responsive to determining that the difference is less than the threshold.

16. The method of claim 14, further including:
selecting, by the computer system and responsive to the T2 occurring after the Teff but prior to the Tupd, a plurality of other datasets in addition to the second dataset;
counting, by the computer system, a set number of the second dataset plus the plurality of the other datasets;
comparing, by the computer system, the set number to a first threshold, and
in which the non-notification condition is met responsive to determining that the set number is less than the first threshold.

17. The method of claim 14, in which:
one of the values of the first dataset is a numerical base value, applying the first consequent includes performing a mathematical operation on the numerical base value to produce the first resource, and
further including:
selecting, by the computer system and responsive to the T2 occurring after the Teff but prior to the Tupd, a plurality of other datasets in addition to the second dataset, the plurality of other datasets having respective other numerical base values;
computing, by the computer system, a sum of the numerical base value and the other numerical base values; and
comparing, by the computer system, the sum to a second threshold, and in which the non-notification condition is met responsive to determining that the sum is less than the second threshold.

18. The method of claim 14, in which:
one of the values of the first dataset is a numerical base value, applying the first consequent includes performing a mathematical operation on the numerical base value to produce the first resource, and
further including:
selecting, by the computer system and responsive to the T2 occurring after the Teff but prior to the Tupd, a plurality of other datasets in addition to the second dataset, the plurality of other datasets having respective other numerical base values;
counting, by the computer system, a set number of the second dataset plus the plurality of the other datasets;
comparing, by the computer system, the set number to a first threshold;
computing, by the computer system, a sum of the numerical base value and the other numerical base values; and
comparing, by the computer system, the sum to a second threshold, and
in which the non-notification condition is met responsive to determining that the set number is less than the first threshold, and the sum is less than the second threshold.

* * * * *